United States Patent
Wolf

(10) Patent No.: US 7,124,876 B2
(45) Date of Patent: Oct. 24, 2006

(54) DIVERTER

(75) Inventor: Stephen C Wolf, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 10/796,917

(22) Filed: Mar. 10, 2004

(65) Prior Publication Data

US 2004/0231960 A1 Nov. 25, 2004

Related U.S. Application Data

(60) Provisional application No. 60/477,720, filed on Jun. 11, 2003, provisional application No. 60/456,777, filed on Mar. 21, 2003.

(51) Int. Cl.
*B65G 47/10* (2006.01)
(52) U.S. Cl. .................... 198/370.08; 198/370.01; 198/370.1; 198/367
(58) Field of Classification Search .................. 198/370.08–370.09, 367, 370.01, 370.1
See application file for complete search history.

(56) References Cited

U.S. PATENT DOCUMENTS

| | | | | |
|---|---|---|---|---|
| 1,729,671 A | * | 10/1929 | Bell-Irving et al. | 198/367 |
| 1,909,481 A | * | 5/1933 | Allen | 198/367 |
| 3,026,988 A | * | 3/1962 | Fisk | 198/411 |
| 3,045,801 A | | 7/1962 | Graybeal | 198/24 |
| 3,093,236 A | * | 6/1963 | McLaughlin | 198/370.08 |
| 3,104,755 A | | 9/1963 | Zuercher | 198/185 |
| 3,246,733 A | | 4/1966 | Torbet et al. | 198/185 |
| 3,397,779 A | * | 8/1968 | Wilder | 209/657 |
| 3,578,141 A | * | 5/1971 | Sheehan | 198/415 |
| 3,721,331 A | * | 3/1973 | Holbrook et al. | 198/367 |
| 4,298,117 A | | 11/1981 | Kobayashi et al. | 198/367 |
| 4,441,604 A | * | 4/1984 | Schlig et al. | 198/598 |
| 4,643,291 A | * | 2/1987 | Counter et al. | 198/370.07 |
| 4,711,357 A | * | 12/1987 | Langenbeck et al. | 209/565 |
| 4,850,471 A | * | 7/1989 | Annas et al. | 198/349.3 |
| 5,010,998 A | | 4/1991 | MacMillan | 198/372 |
| 5,217,104 A | * | 6/1993 | Pelletier | 198/367 |
| 5,452,786 A | * | 9/1995 | Gilmore | 198/367 |
| 5,655,643 A | * | 8/1997 | Bonnet | 198/370.08 |
| 5,871,078 A | * | 2/1999 | Arnarson et al. | 198/358 |
| 6,068,105 A | * | 5/2000 | Darwish et al. | 198/370.02 |
| 6,216,847 B1 | * | 4/2001 | Schmidt | 198/463.3 |
| 6,607,065 B1 | | 8/2003 | Peppel | 198/367 |
| 6,974,020 B1 | * | 12/2005 | Peppel | 198/370.07 |
| 2002/0070094 A1 | | 6/2002 | Peppel | 198/370.07 |

FOREIGN PATENT DOCUMENTS

| | | |
|---|---|---|
| DE | 2242457 | 8/1972 |
| DE | 2620036 | 5/1976 |
| JP | 58036820 | 3/1983 |
| JP | 60232320 | 11/1985 |

* cited by examiner

*Primary Examiner*—Gene O. Crawford
*Assistant Examiner*—Rashmi Sharma
(74) *Attorney, Agent, or Firm*—Van Dyke, Gardner, Linn & Burkhart, LLP

(57) ABSTRACT

A paddle diverter assembly according to the present invention includes an arm and an actuator for actuating the arm to move toward a diverting position. The actuator is adapted to permit the arm to move away from the diverting position upon impact with the object to be diverted and then to return to the diverting position to thereby absorb at least some of the impact between the arm and an object being diverted.

40 Claims, 30 Drawing Sheets

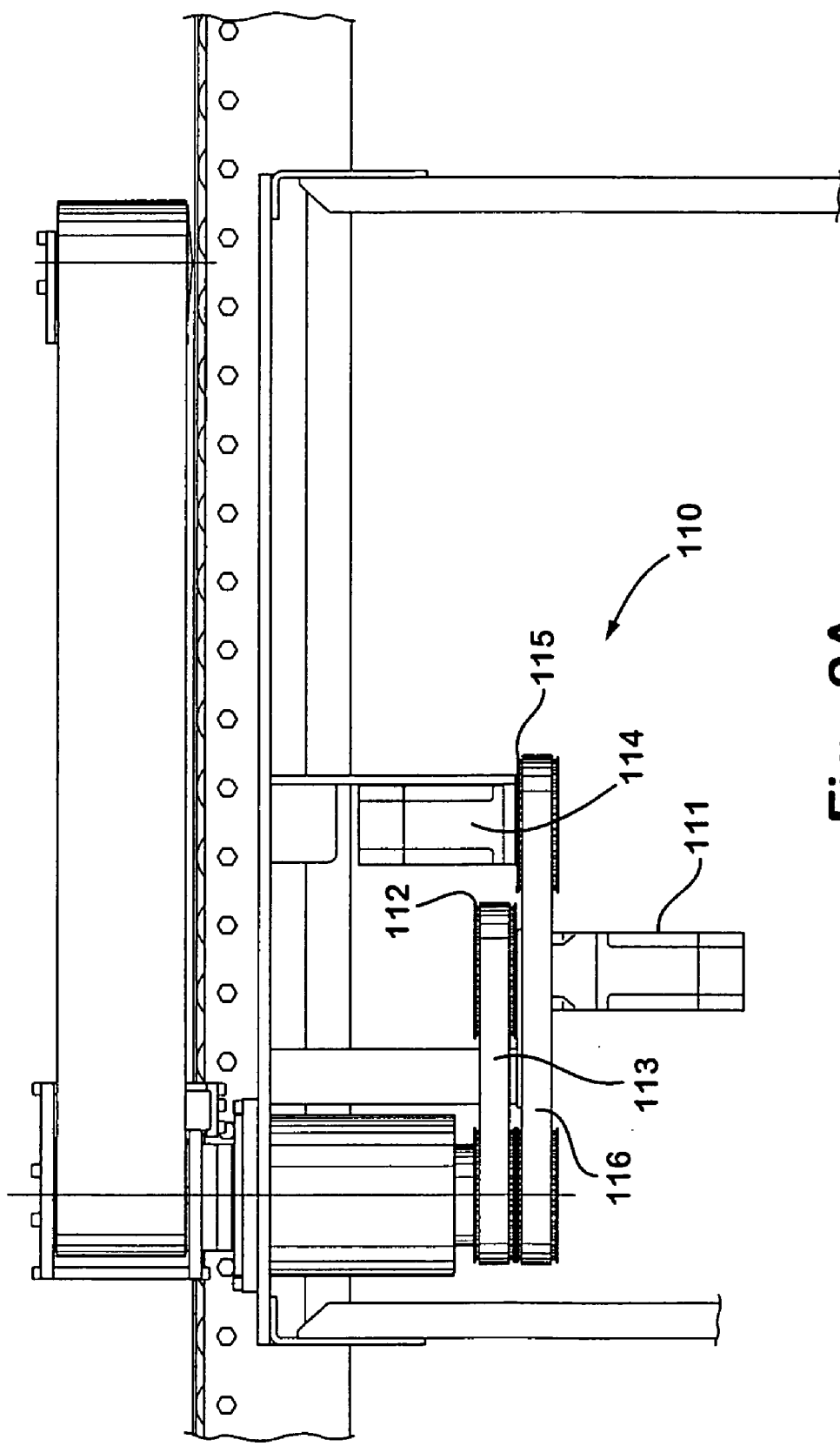

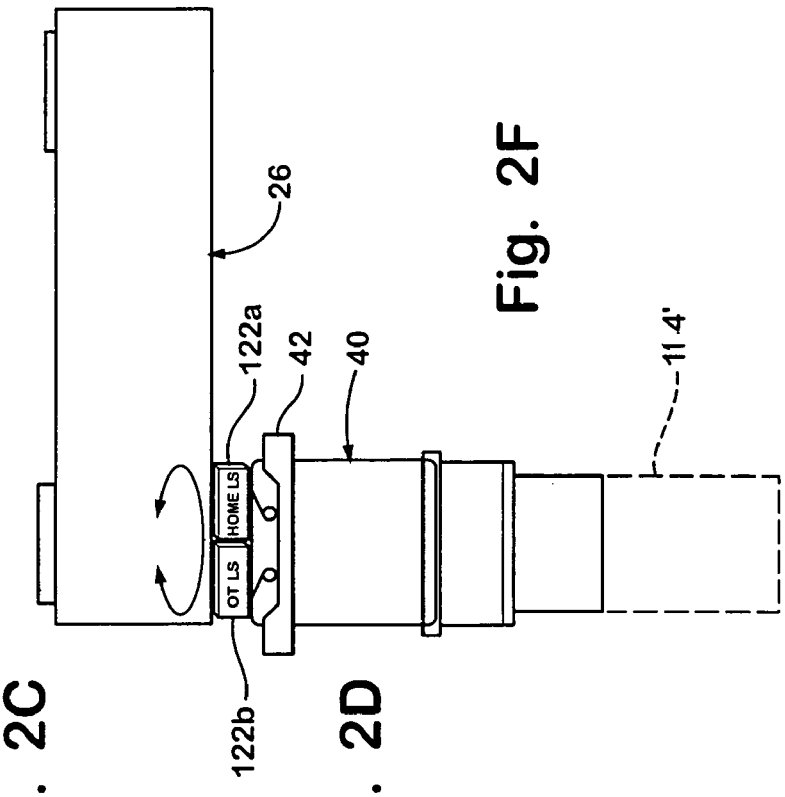
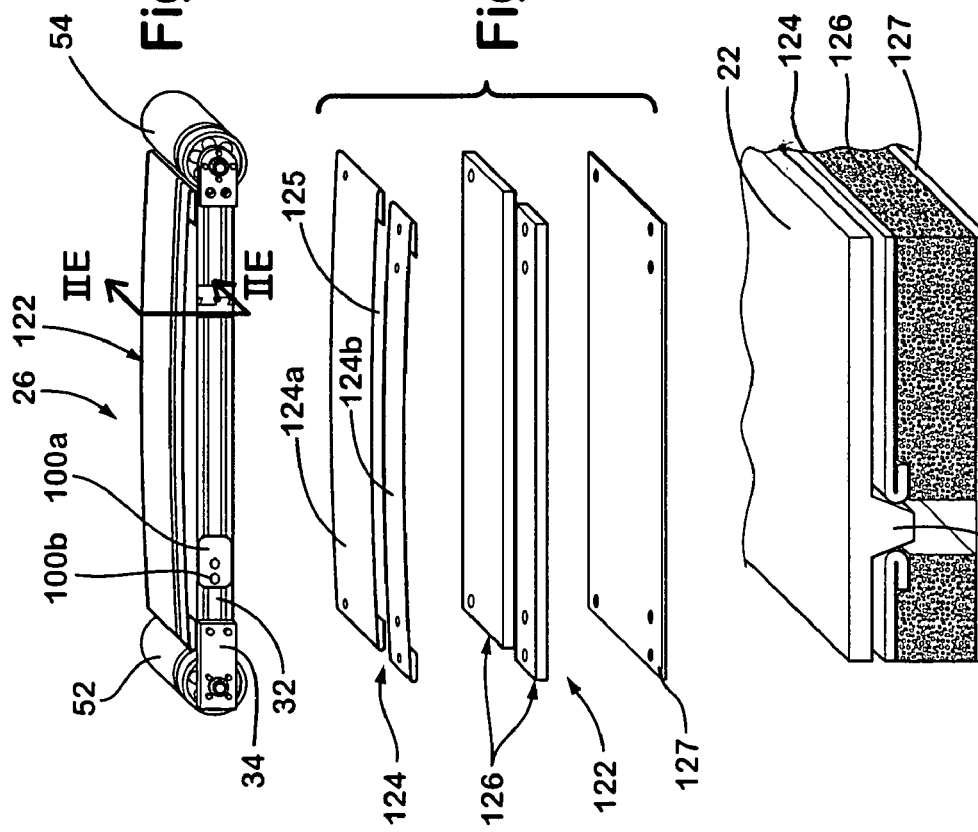

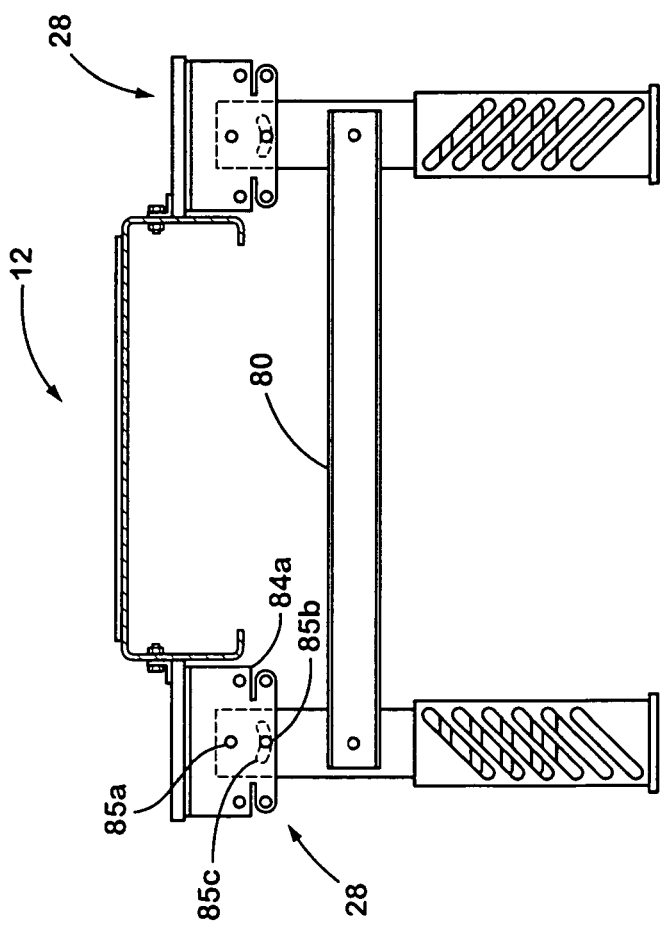
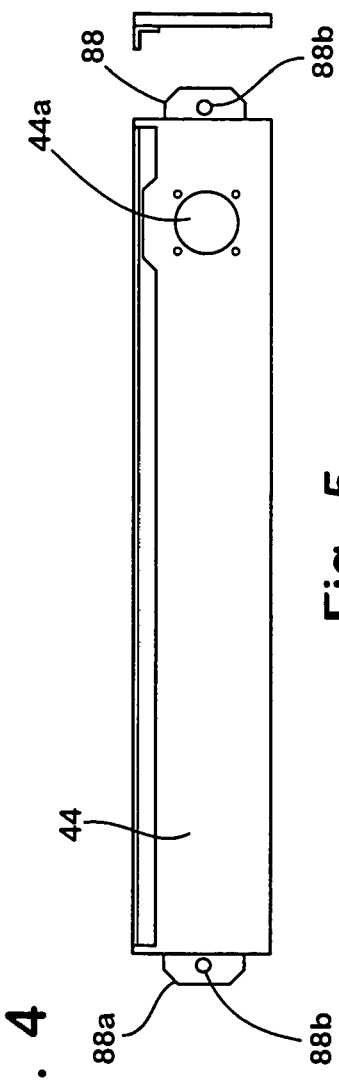

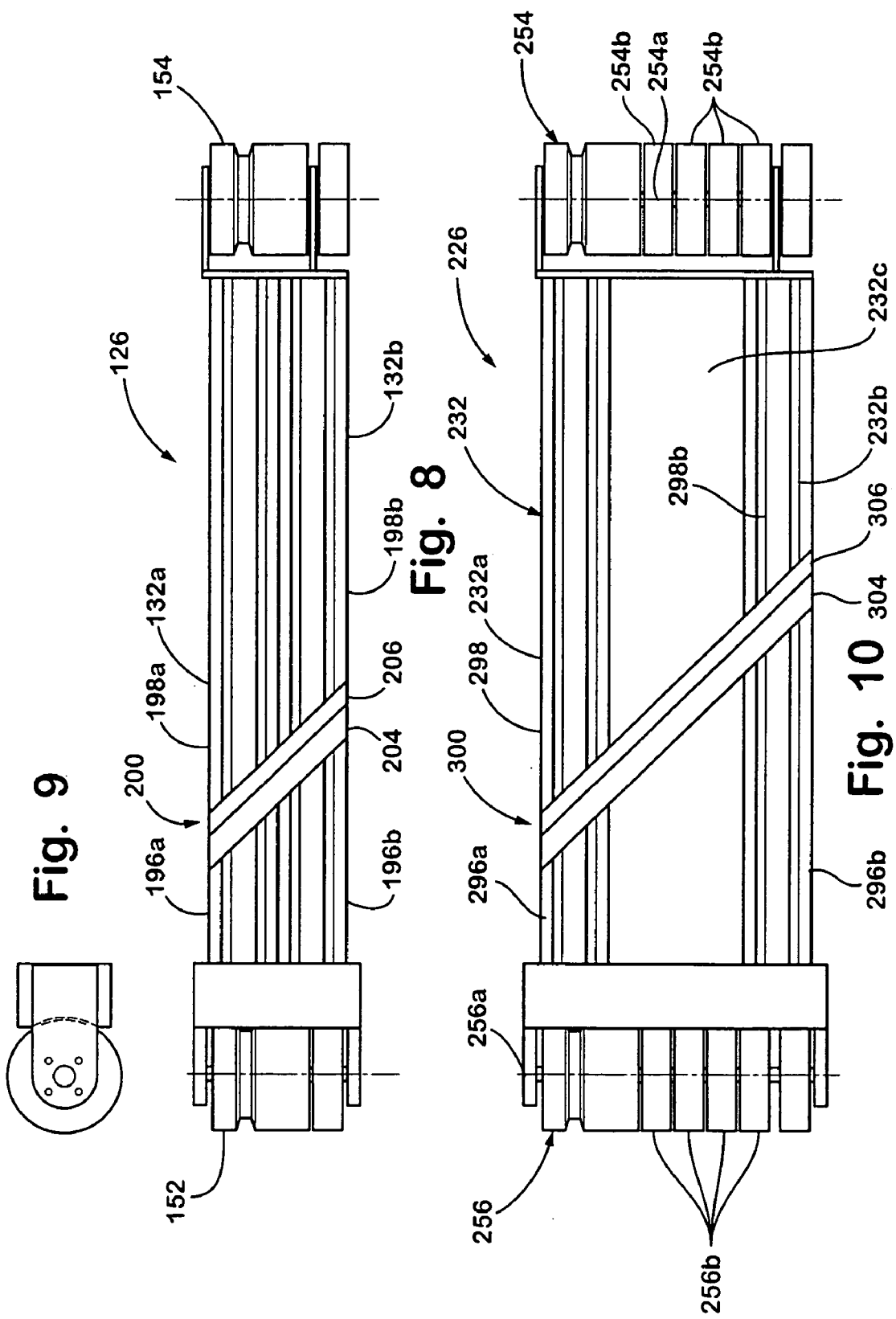

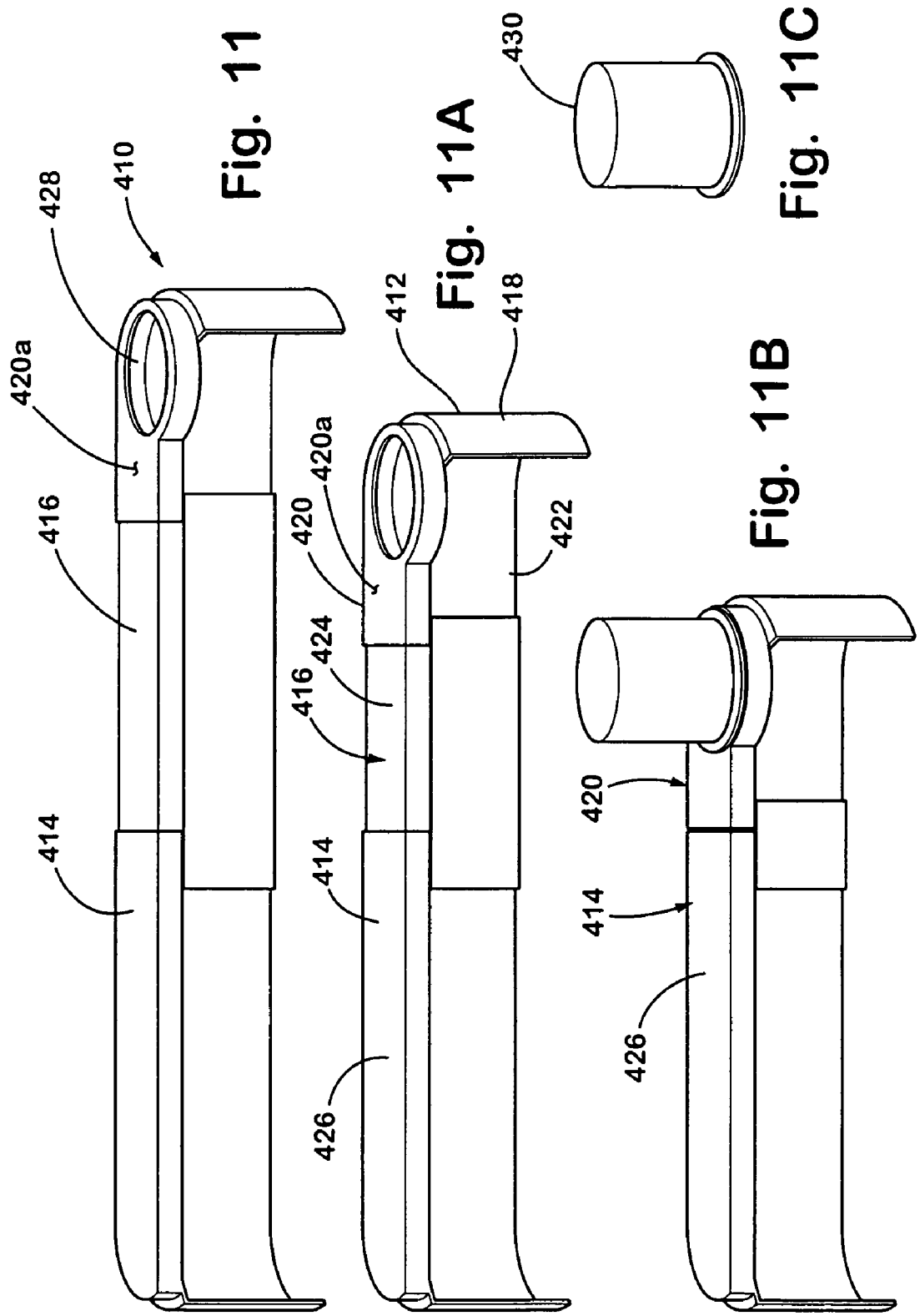

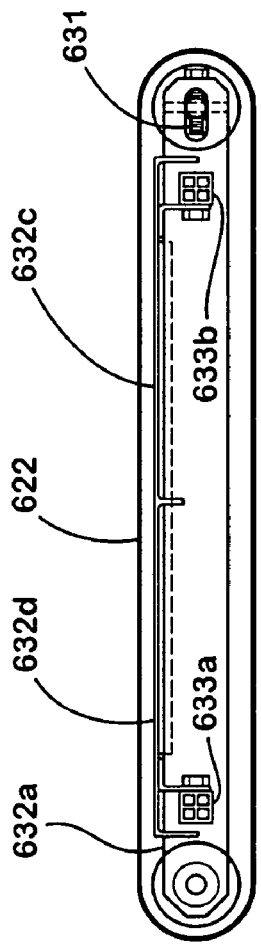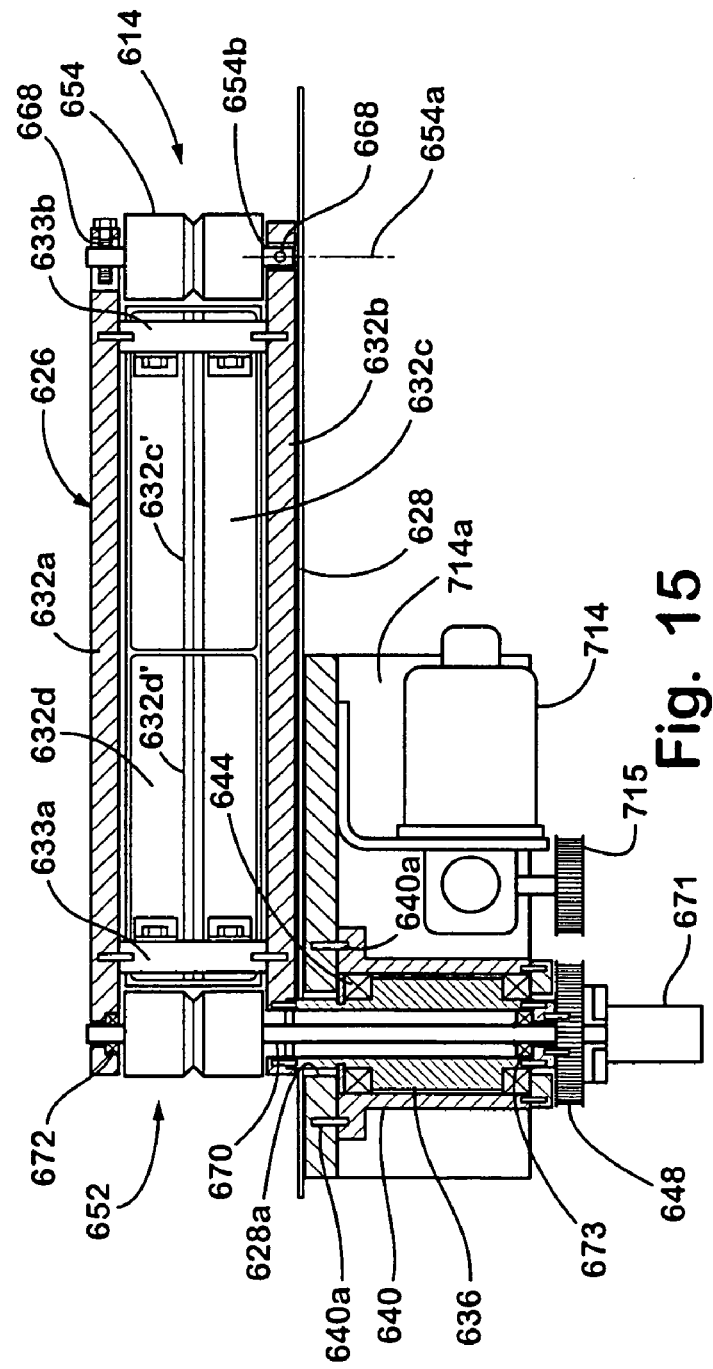
Fig. 16
Fig. 15

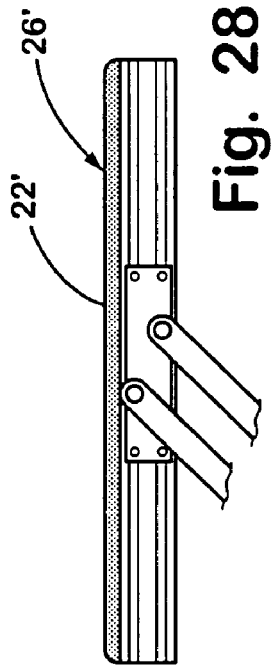
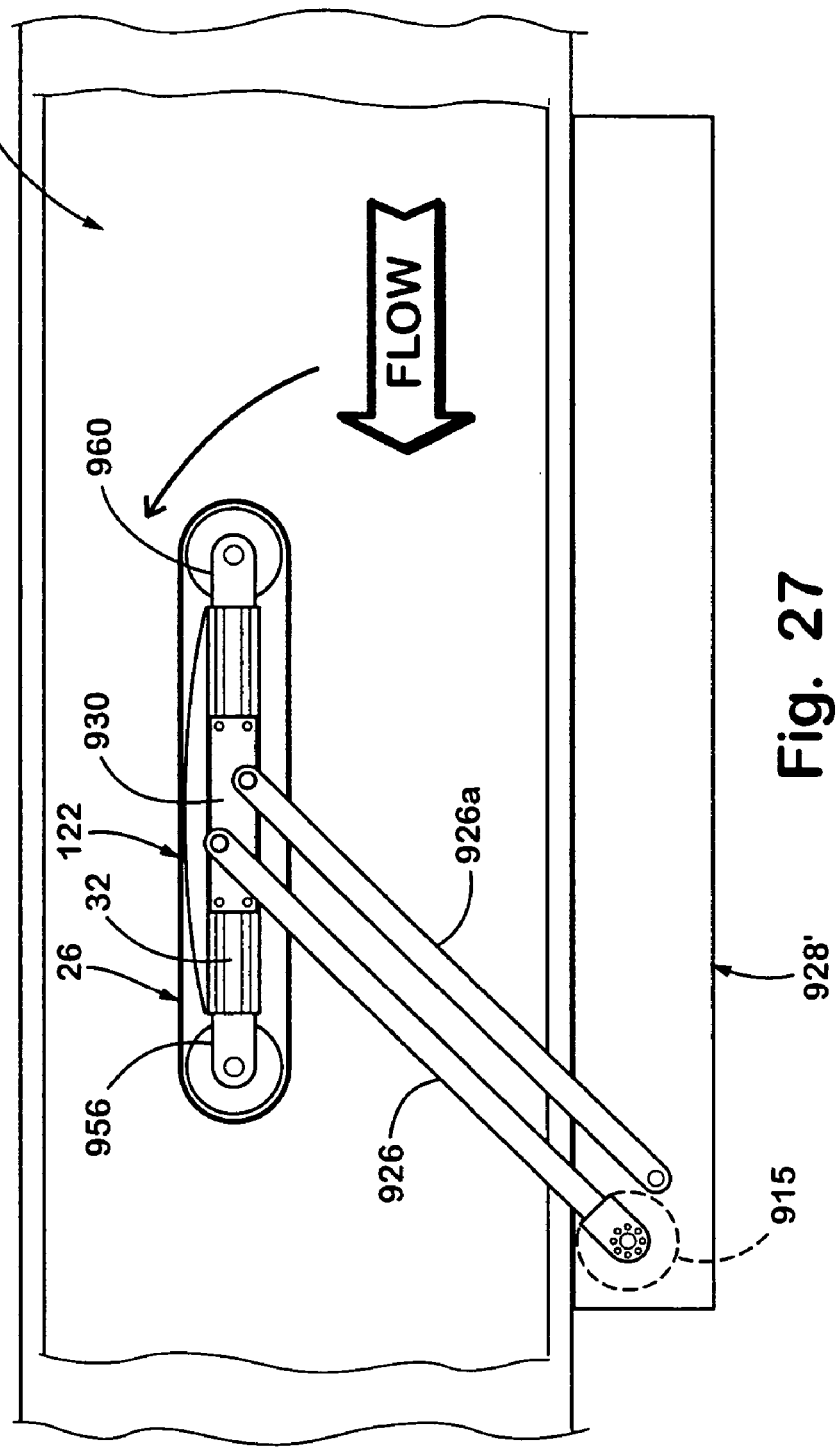

DIVERTER

This application incorporates by reference herein in its entirety pending U.S. provisional application entitled ASYNCHRONOUS PADDLE DIVERTER, Ser. No. 60/477,720, filed Jun. 11, 2003 and pending U.S. provisional application entitled ASYNCHRONOUS PADDLE DIVERTER, Ser. No. 60/456,777, filed Mar. 21, 2003.

TECHNICAL FIELD AND BACKGROUND OF THE INVENTION

The present invention relates to a diverter and, more particularly, to a paddle diverter for use in diverting objects, such as in a material handling system.

Paddle diverters typically comprise arms that are pivotally mounted adjacent, for example, a conveyor. The arms are driven by a driver, such as a motor, either directly or through linkages, to move between a home position, typically, adjacent the conveyor to a diverting position where the arm moves across the conveying surface of the conveyor to divert an object being conveyed on the conveying surface in a diverting direction.

Heretofore, the home and extended positions of paddle diverters have been controlled by mechanical stops; hence, paddle diverters tend to generate significant noise levels and, further, tend to generate a great deal of wear and tear on the components of the paddles due to the impact created with the mechanical stops. The faster the paddle is operated, the greater the noise and the impact on the object being diverted. In addition, the mechanical stops are not generally adjustable and hence tend to limit the application of a paddle diverter.

To increase the divert speed of the paddle diverter, many paddles incorporate belts. The belts are tensioned and driven so that they can impart speed to the object being diverted to generally maintain the throughput of the conveyor system. However, over time the belts require replacement, which heretofore requires the disassembly of the paddle diverter, which is time consuming and hence costly.

Consequently, there is a need for a diverter that can be operated at higher speeds while generating lower noise levels and, further, reducing the impact on the article being diverted. Furthermore, there is a need for a diverter for which belt replacement is simpler and quicker than heretofore known.

SUMMARY

Accordingly, the present invention provides a paddle diverter assembly that reduces the impact on objects being diverted and also produces less noise than existing paddle diverters. Furthermore, when the paddle diverter assembly includes a drive belt, the paddle diverter assembly of the present invention is adapted to permit easy replacement of the drive belt without requiring the complete disassembly of the paddle diverter assembly.

In one form of the invention, a paddle diverter assembly includes an arm and a drive system for moving the arm between a non-diverting position and a diverting position.

The drive system is adapted to permit the arm to absorb at least some of the impact and to move away from the diverting position upon impact with an object being diverted to reduce the impact on the object being diverted.

In one form of the invention, the drive system is adapted to permit the arm to return to the diverting position after the impact with the object.

In other aspects, the arm includes a driven diverting surface, such as a drive belt.

In other aspects the drive system comprises a driver, such as a motor, and a servo controller that selectively powers the driver to selectively move the arm of the diverter assembly.

In yet a further aspect, the arm of the paddle diverter assembly includes a spring to absorb at least some of the impact with the object being diverted. For example, the spring may comprise a plate spring and may be provided at the medial portion of the arm.

The plate spring includes a longitudinal extent that extends along the longitudinal axis of the arm. When incorporating a drive belt with a rib or ribs, the plate spring may include a corresponding longitudinal groove or grooves extending along its longitudinal extent, with the rib or ribs extending into the groove or grooves of the plate spring, which thereby provides support to the belt.

According to yet other aspects, the arm includes at least first and second arm portions, with the arm portions releasably interlocked. When released, the first and second arm portions permit removal of the drive belt without disassembly of the paddle diverter assembly. For example, the arm portions are preferably slidably interlocked.

Furthermore, the first and second arm portions may include a slidable joint therebetween, which permits the first and second arm portions to slide relative to each other and, further, permits the first and second arm portions to be selectively fixable when the first and second arm portions are interlocked. For example, the slidable joint may comprise a dovetail joint and, preferably, an angled dovetail joint wherein relative movement of one of the arm portions results in a reduction in the overall length of the arm to facilitate removal of the belt. Furthermore, the arm portions preferably comprise extruded non-solid members that provide rigidity to the arm while lowering the weight of the arm.

According to another form of the invention, a diverter system includes a conveying surface, a pair of diverter assemblies at opposite sides of the conveying surface, and a drive system. Each of the diverter assemblies comprises an arm mounted for pivotal movement between a non-diverting position, wherein the arm is adjacent the conveying surface, and a diverting position, wherein the arm is pivoted across at least a portion of the conveying surface. The drive system independently and selectively moves the arms between their diverting and non-diverting positions wherein an article conveyed on a conveying surface is diverted in a diverting direction when the article contacts one of the arms when the one arm is in its diverting position.

In one aspect, the drive system permits the arms to move away from their diverting positions when impacting the article to be diverted to reduce the impact on the article and, further, moves the arms back to their non-diverting positions after the article is diverted.

In other aspects, the drive system comprises a motor for each arm, with the motors independently actuated to independently pivot the arms. For example, the drive system may comprise a controller, which selectively actuates the motors of the respective arms. A suitable controller may comprise a servo controller.

In other aspects, each of the arms includes a driven diverting surface, such as a drive belt. The drive belts are driven by driven rollers, which in turn are driven by the drive system. Furthermore, each driven roller includes a driven axis about which the driven roller is driven. The arms pivot about respective pivot axes when pivoting between their non-diverting and diverting positions, with the driven axis of a driven roller of a respective arm being preferably generally co-linear with the pivot axis of the respective arm.

According to yet other aspects, the drive system is adapted to decouple movement of the drive belts about their driven axes from the movement of the arms about their pivot axes. For example, the drive system may include separate drivers for pivoting the arms and for driving the drive belts, which are independently actuated by the drive system.

According to yet another form of the invention, a belted driving assembly includes a rigid member, first and second pulleys mounted to the rigid member and spaced apart along the longitudinal axis of the rigid member, and a drive belt which is supported by the pulleys. The rigid member comprises first and second portions, with the first and second portions releasably interlocked at a fixed length wherein the tension on the drive belt is maintained and being releasable wherein the first and second pulleys can be moved closer together wherein the drive belt can be removed for repair or replacement.

In one aspect, the first and second portions are interlocked by a slidable joint, such as a dovetail joint. Preferably, the joint is non-orthogonal to the longitudinal axis of the rigid member wherein relative movement of one of the first and second portions will result in the overall length of the rigid member being reduced so that the pulleys are moved closer together to permit easy removal of the belt from the assembly.

Accordingly, the present invention provides a paddle diverter assembly that reduces impact on objects being diverted and, further, reduces the noise generated by the diverter assembly. In addition, when belts are incorporated, the present invention provides a paddle configuration that facilitates removal of the belt. These and other objects and advantages will be appreciated from the drawings and description that follow.

DETAILED DESCRIPTION OF THE DRAWINGS

FIG. 2A is a partial enlarged view of the paddle diverter assembly of FIG. 2 illustrating the drive mechanisms of the paddle diverter assembly of the present invention;

FIG. 2C is a perspective view of the arm of the diverter assembly of the present invention;

FIG. 2D is a partial exploded perspective view of the impact plate or spring of the arm of FIG. 2C;

FIG. 2E is an enlarged cross-section view taken along line IIE—IIE of FIG. 2C;

FIG. 2F is a schematic elevation of the arm and motor illustrating position switches;

FIG. 4 is a cross-section view taken along line IV—IV of FIG. 3;

FIG. 5 is a plan view of the diverter assembly frame of FIG. 3;

FIG. 8 is a side elevation view of another embodiment of an arm of the paddle diverter assembly of the present invention;

FIG. 9 is a top plan view of the pivot end of the arm of FIG. 8;

FIG. 11 is a front perspective view of an arm cover for the arm of the paddle diverter assembly of FIG. 2;

FIG. 11A is a similar view to FIG. 11 of the cover illustrating the length of the cover adjusted;

FIG. 11B is a similar view to FIG. 11 illustrating the arm cover adjusted to its minimum length and, further, incorporating a motor cover;

FIG. 11C is a perspective view of the motor cover;

FIG. 15 is a side elevation view of the diverter assembly of FIG. 14;

FIG. 16 is a plan view of the diverter assembly of FIG. 15;

FIG. 27 is a plan view of a justifier assembly incorporating the paddle diverter assembly of the present invention;

FIG. 28 is an enlarged view of the edge justifier of FIG. 21; and

DETAILED DESCRIPTION OF THE PREFERRED EMBODIMENTS

Figure 1:
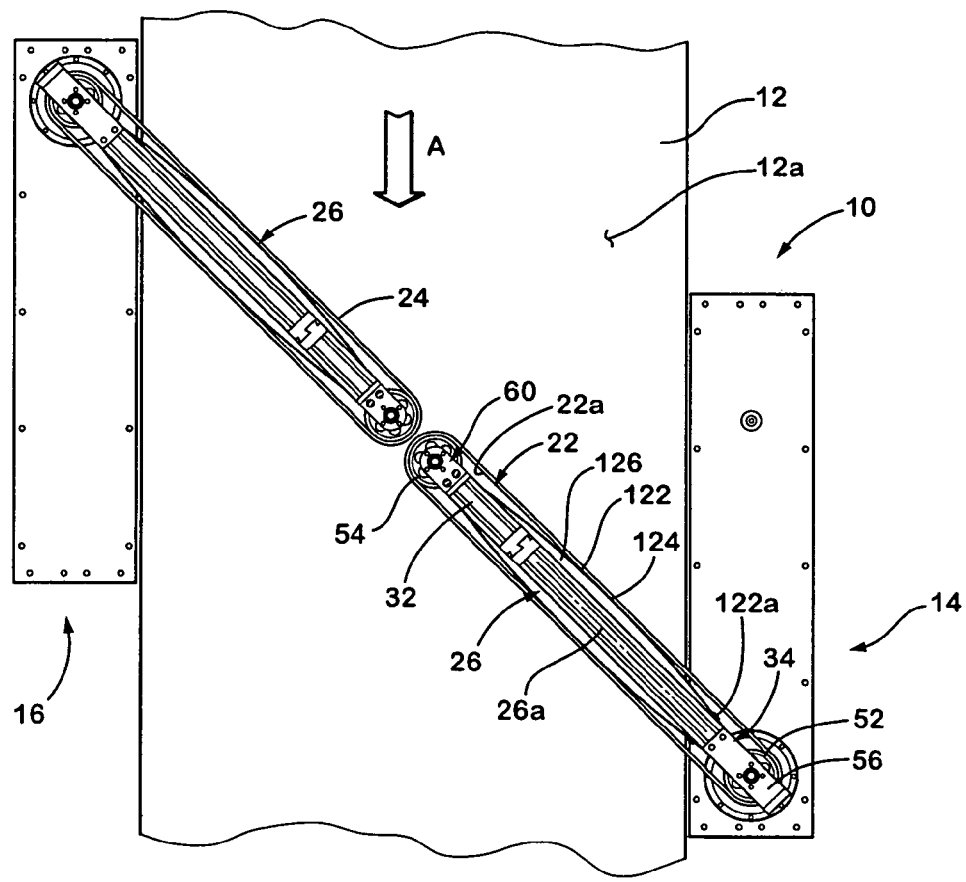
FIG. 1 is a plan view of a diverting system of the present invention, which includes a conveyor section and a pair of paddle diverter assemblies.
Figure 1A:
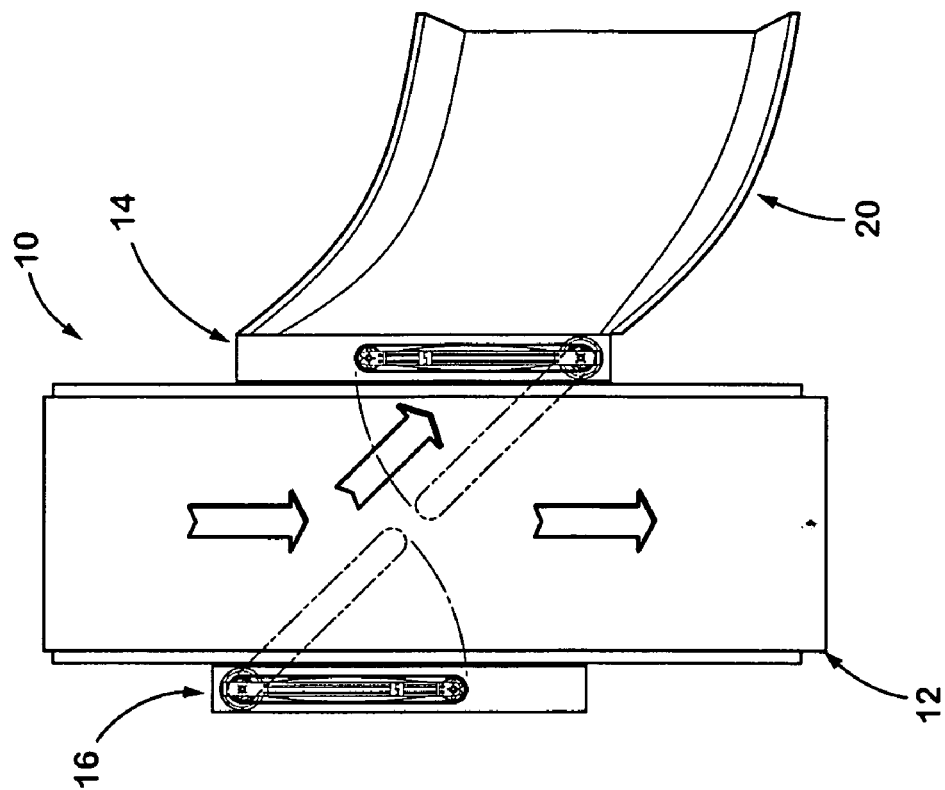
FIG. 1A illustrates a roller conveyor adjacent the diverter system of FIG. 1.
Figure 1B:
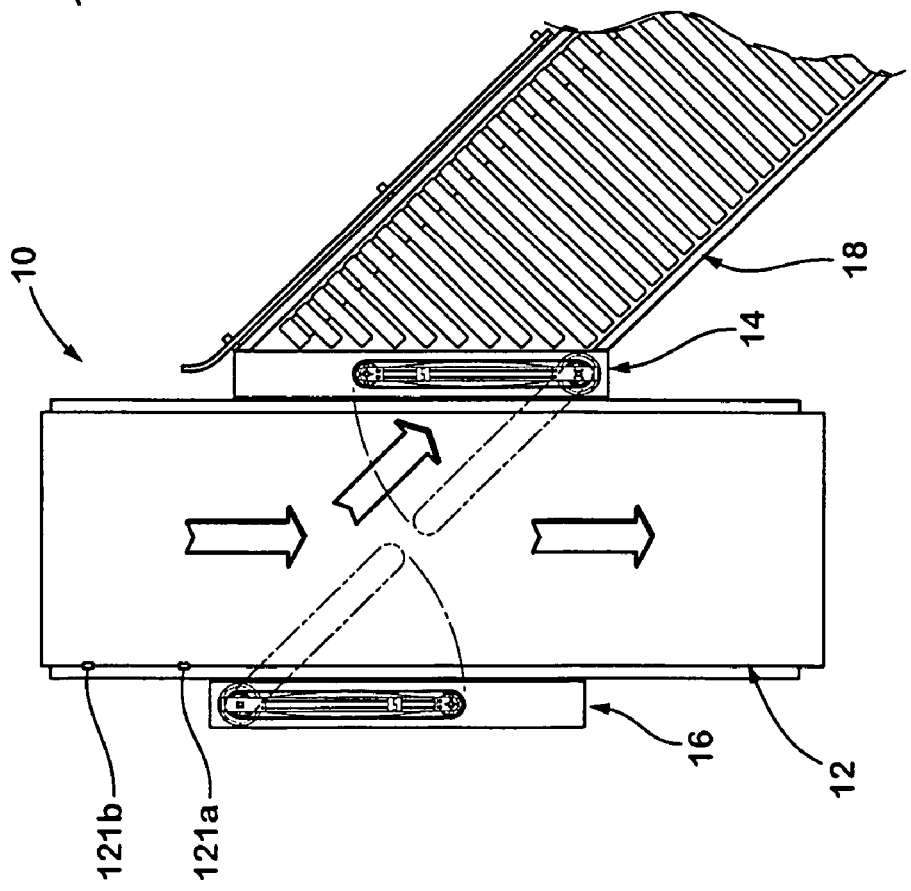
FIG. 1B illustrates a gravity chute adjacent the diverter system of FIG. 1.

Referring to FIG. 1, the numeral 10 designates a diverter system of the present invention. Diverter system 10 includes a conveying surface 12 and a pair of paddle diverter assemblies 14 and 16, which may be selectively actuated to divert objects conveyed on conveying surface 12a of conveyor 12 in a diverting direction, which is non-parallel with the conveying direction indicated by the arrow A in FIG. 1. In the illustrated embodiment paddle diverter assembly 16 acts as a lead diverter assembly, while paddle diverter assembly 14 acts as a lag diverter assembly. Referring to FIG. 1A, diverter assemblies 14 and 16 may be used to divert articles onto a roller conveyor 18, which may be positioned adjacent diverter assembly 14. Alternately, diverter assemblies 14 and 16 may divert articles or objects to a discharge chute 20, such as shown in FIG. 1B, or the like. As will be more fully described below, paddle diverter assemblies 14, 16 are adapted to generate less noise and reduce the impact on the objects being diverted and, further, are assembled in a manner to permit easy removal of the respective drive belts 22, 24 (FIG. 1) of the diverter assemblies.

Referring again to FIG. 1, paddle diverter assemblies 14 and 16 are preferably substantially identical units, which can be positioned on either side of the conveyor. Furthermore, as will be described below that can be used individually as a single diverter assembly. For ease of reference, the description of paddle diverter assemblies 14 and 16 will be made in reference to paddle diverter assembly 14.

Figure 2:
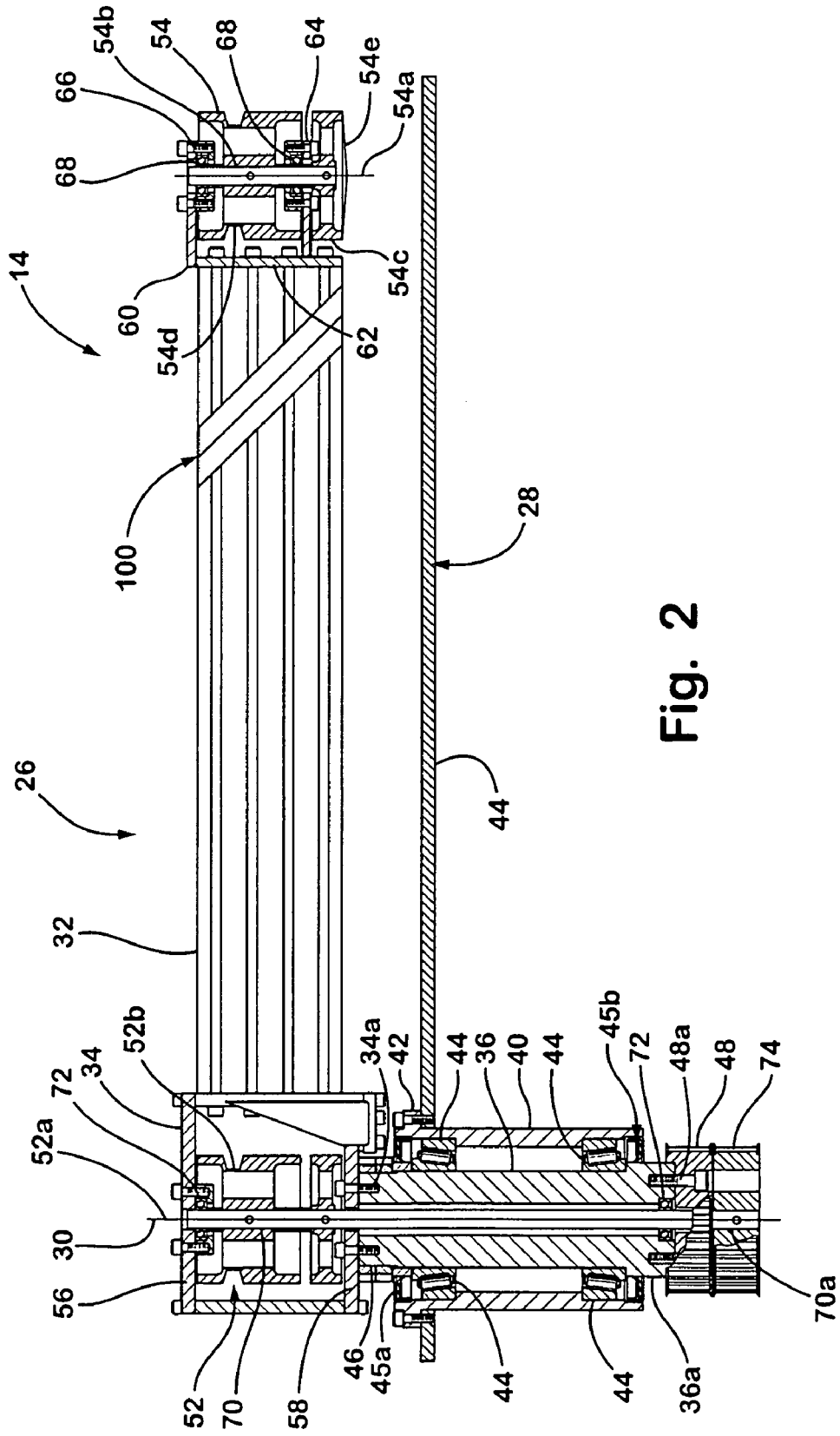
FIG. 2 is a fragmentary side elevation view of the right side paddle diverter assembly of FIG. 1.

Referring to FIG. 2, paddle diverter assembly 14 includes an arm 26 that is pivotally mounted (about a pivot axis 30) to a frame 28, which is positioned adjacent conveyor 12. Further details of frame 28 will be made in reference to FIGS. 3–5 described below. Arm 26 includes an elongated member, preferably an aluminum extruded member 32, and an arm mount 34, which is mounted to a hollow pivot cylindrical 36 that extends through frame 28. In this manner, arm 26 is relatively light and rigid, though it should be understood that arm 26 may be formed from a solid member and/or composite member assembled from several parts. Cylinder 36 is driven about its drive axis 36a by a drive system 110 described in greater detail in reference to FIG. 2A. Arm mount 34 is rigidly coupled to pivot cylinder 36, for example, by fasteners 34a, so that when cylinder 36 is driven about drive axis 36a, arm 26 and pivot cylinder 36 will pivot about pivot axis 30 and drive axis 36a in unison.

Pivot cylinder 36 is journaled in frame 28 by a cylindrical hub 40 that is mounted to frame 28. Frame 28 includes an upper flange or plate member 44 with an opening 44a through which pivot cylinder 36 extends. Cylindrical hub 40 includes an upper flange 42 that rests on the upper surface of and is secured to plate member 44 of frame 28 by, for example, fasteners. Cylindrical hub 40 supports a plurality of bearings, such as roller bearings 44, which journal pivot cylinder 36 and provide lateral support to pivot cylinder 36 in hub 40. Pivot cylinder 36 is vertically supported in hub 40 by an annular lock nut 46 that is mounted to cylinder 36 and bears on spacers 45a provided at the upper end of hub 40. Furthermore, the lower end of cylindrical pivot cylinder 36 includes an enlarged shoulder 36a which bears against spacers 45b provided in the lower end of hub 40 to limit upward movement of pivot cylinder 36 in hub 40. Mounted to the lower most end of pivot cylinder 36 is a gear sprocket or pulley 48, for example, by fasteners 48a, which is driven by a driver, such as a motor, which will be more fully described below in reference to drive system 110. In this manner, when sprocket 48 is driven to rotate pivot cylinder 36 about its drive axis 36a, arm 26 will rotate about pivot axis 30 to move between its diverting and non-diverting positions.

Figure 2B:
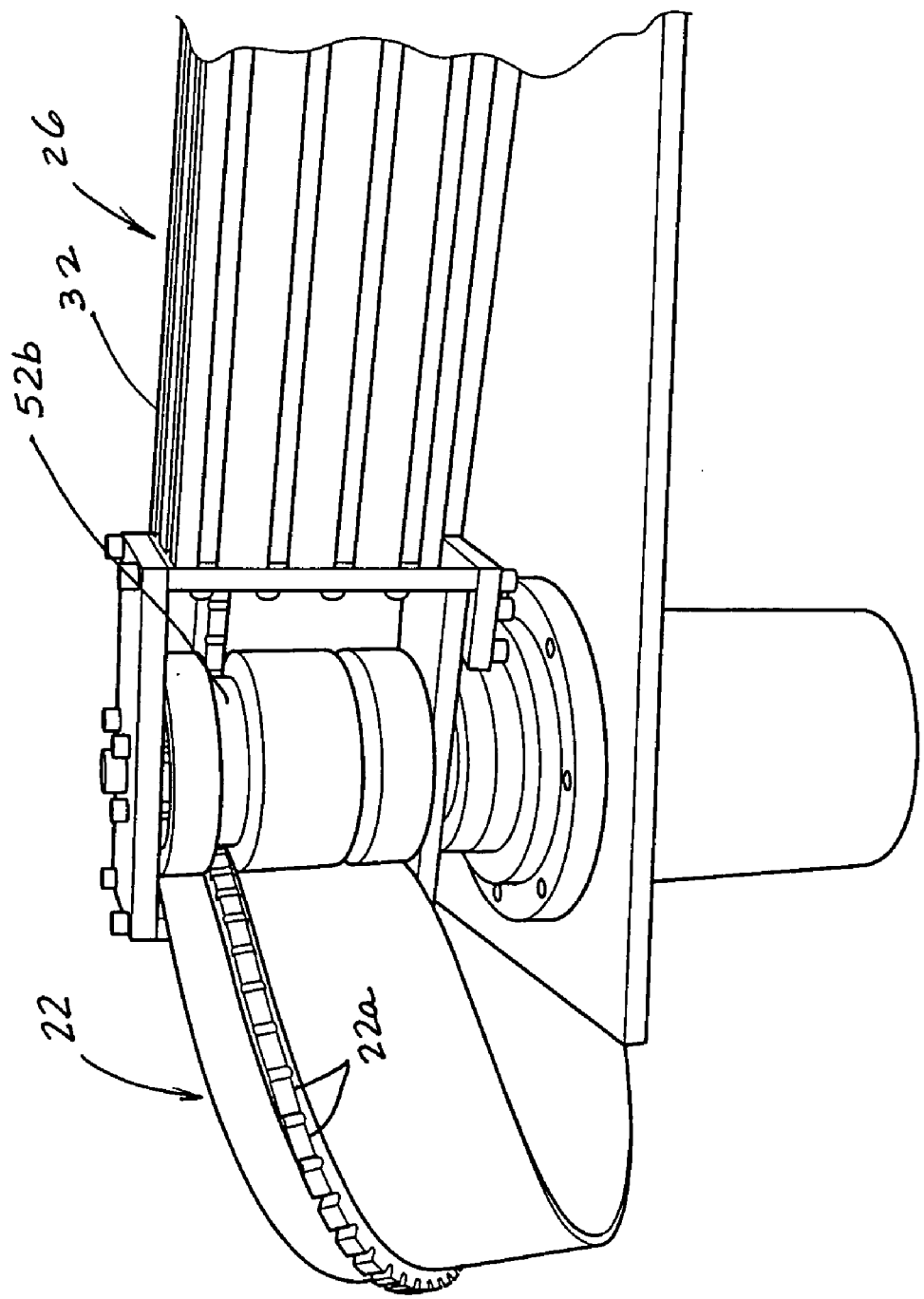
FIG. 2B is a partial elevation view of the diverter assembly with the driven belt partially removed for clarity.

As noted above, in the illustrated embodiment, paddle diverter assembly 14 includes a driven diverting surface, preferably a driven belt 22. Referring again to FIGS. 1 and 2, arm 26 includes a drive pulley 52 and a slave pulley 54 for driving and supporting belt 22. As best seen in FIG. 2B, belt 22 includes one or more guide ribs 22a that project inwardly and, further, extend into corresponding grooves 52b and 54d formed or provided in pulleys 52 and 54, respectively. In this manner, pulleys 52 and 54 provide vertical guides and support to belt 22. Drive pulley 52 is mounted between the upper and lower members 56 and 58 of arm mount 34 and, further, is positioned such that its drive axis 52a is substantially collinear with pivot axis 30 of arm 26. Pulley 54 is mounted at the distal end of arm 26 by a bracket 60. Bracket 60 comprises a generally C-shaped bracket with a web or base member 62 and a pair of outwardly extending ears or flanges 64 and 66. Base member 62 mounts to the distal end of extruded member 32, for example, by fasteners that extend into member 32.

Pulley 54 is mounted between flanges 64 and 66 by a shaft 54b, which is journaled in flanges 64 and 66 on bearings 68, which permit pulley 54 to rotate about its respective rotational axis 54a. Similarly, pulley 52 is mounted in arm mount 34 on a shaft 70, which is journaled in upper member 56 of arm mount 34 and lower end 36a of pivot shaft 36 by bearings 72. The lower most end 70a of drive shaft 70 is coupled to a drive pulley or sprocket 74, which in turn is coupled to a driver, such as a motor, as will be more fully described below in reference to drive system 110. In this manner, when drive sprocket 74 is driven about axis 30, drive pulley 52 will drive belt 22 about pulley 54 and, in turn, around arm 26.

Optionally, paddle diverter assembly 14 includes a pulley hub 54e that is mounted to lower segment 54c of pulley 54e. Hub 54c preferably comprises a low friction material, such as plastic, and provides a support for arm 26 at its cantilevered end in the event the arm 26 is loaded vertically downward, for example, by someone stepping on the arm. As a result, hub 54e protects the bearings and other components of paddle diverter assemblies 14, 16 in the even that the cantilevered end of arm 26 is loaded sufficiently to cause it to deflect.

Figure 3:
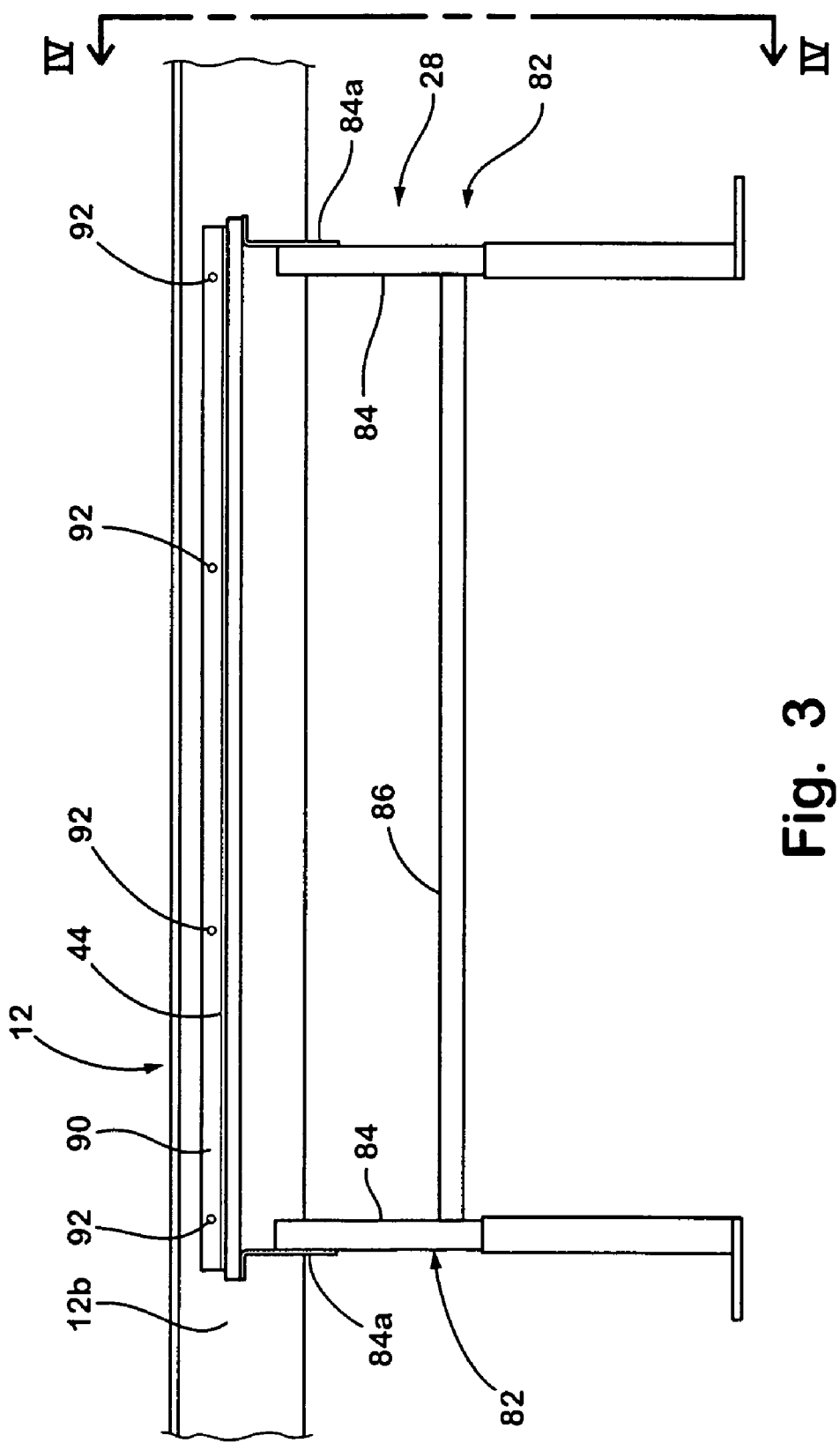
FIG. 3 is a side elevation view of the frame of the paddle diverter assembly of the present invention.
Figure 6:
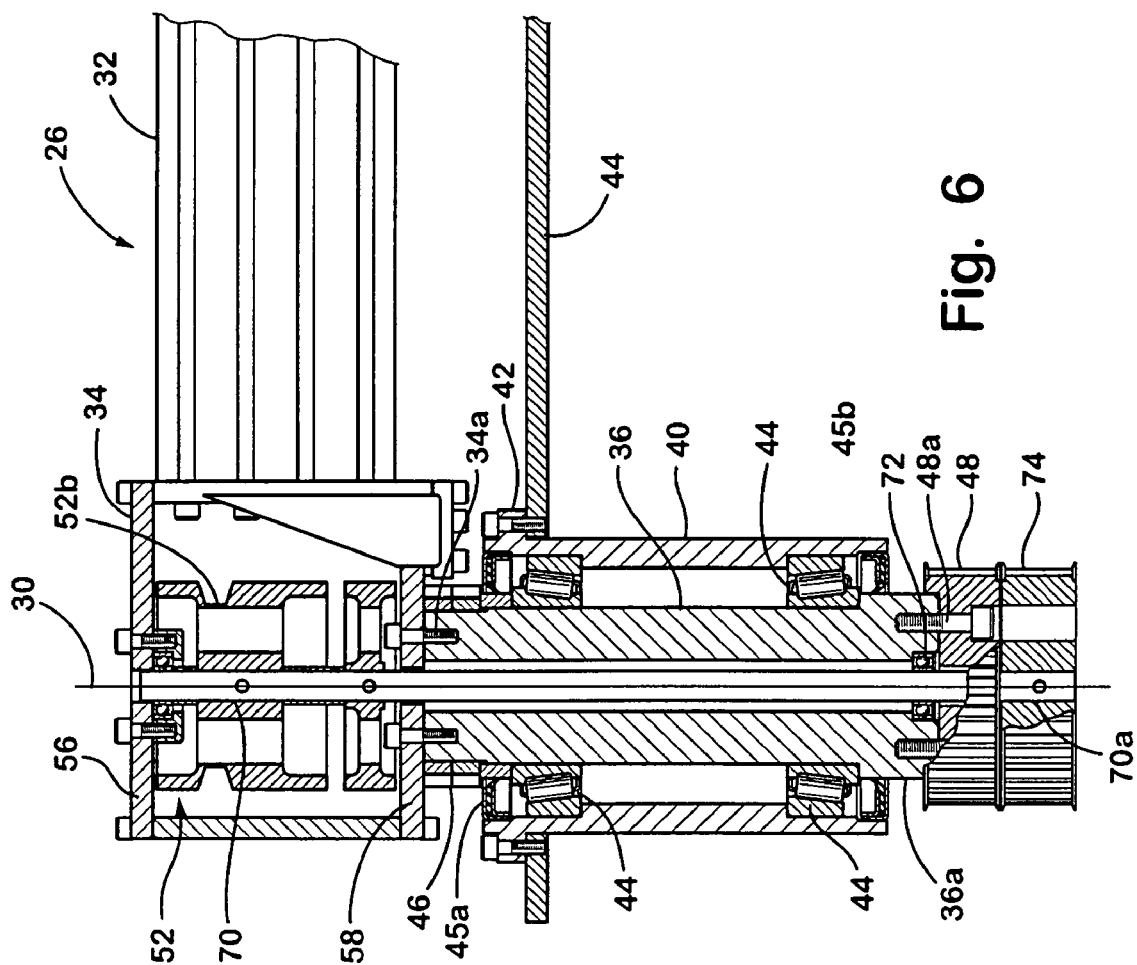
FIG. 6 is an enlarged partial fragmentary view of the arm mounting mechanism of the paddle diverter assembly of FIG. 2.

Referring to FIGS. 3–5 and as noted above, paddle diverter assemblies 14 and 16 are supported adjacent conveyor 12 by frames 28. Frames 28 are preferably interconnected by a transverse member 80, which extends under conveyor 12. As best seen in FIG. 3, each frame 28 includes a pair of adjustable vertical stands 82. Adjustable vertical stands 82 include vertically adjustable members 84 that are interconnected by a cross-frame member 86. Upper flange or plate member 44 is mounted to the adjustable members 84 by brackets 84a so that the height of plate member 44 can be adjusted to suit the as-built conditions of the conveyor. In addition, once adjusted to the appropriate height, plate member 44 optionally and preferably is secured to the side of conveyor 12 by one or more mounting members 90, such as an elongate angle, which is preferably removably mounted to conveyor frame 12b by fasteners 92.

As best understood from FIGS. 3 and 5, plate member 44 includes a pair of mounting tabs or flanges 88a, with mounting openings 88b for securing plate member 44 to brackets 84a by fasteners. Furthermore, referring to FIG. 4, mounting brackets 84a are mounted to extendable members 84 by a pair of fasteners 85a and 85b, with fastener 85b being received in a slotted opening 85c to provide tilt adjustment for plate 44. Mounting brackets 84a may be adapted to provide additional adjustment to accommodate as-built conditions of installed conveyors. It should be understood, therefore, that paddle diverter assemblies 14 and 16 may be retrofit into existing conveyor systems without the need for modification to the conveyor system, which provides increased flexibility and adjustability not heretofore known.

Figure 7:
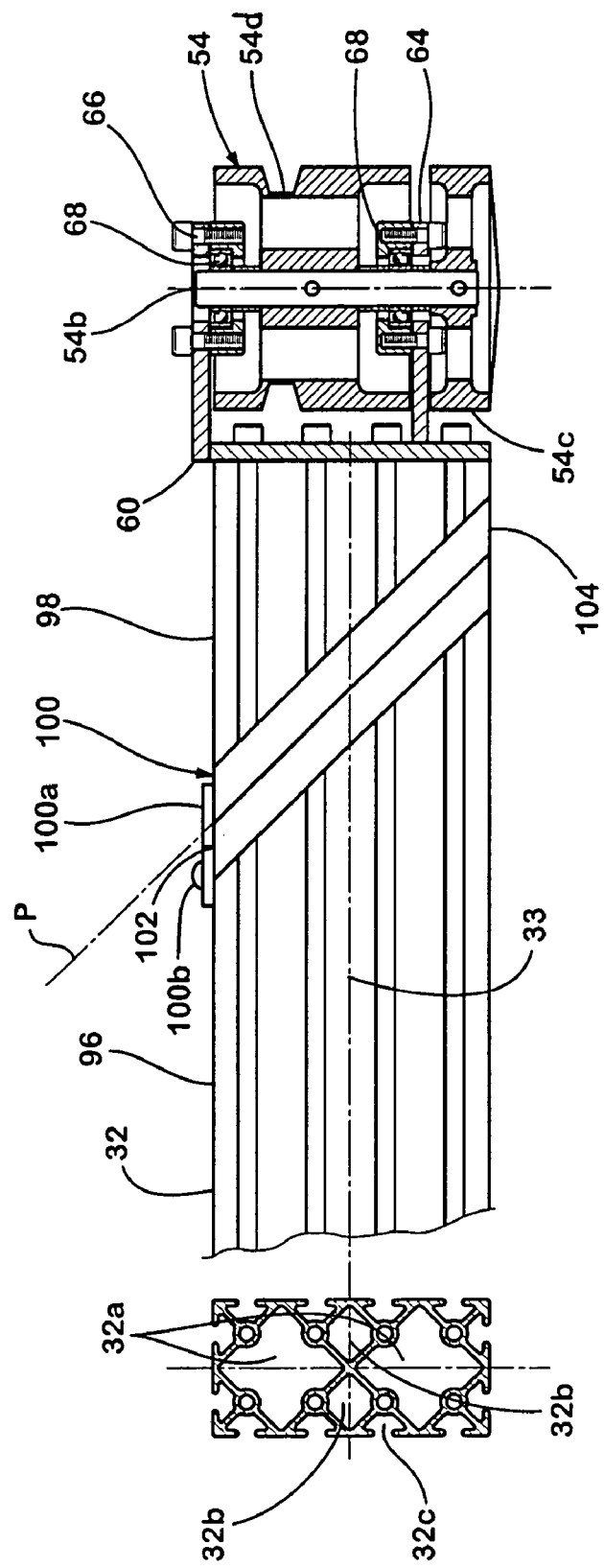
FIG. 7 is an enlarged view of the arm of the paddle diverter assembly of FIG. 2.

As best understood from FIGS. 2 and 7, extruded member 32 comprises a single extrusion, which includes a plurality of transverse passageways 32a, 32b, and grooves 32c extending through member 32. However, it can be appreciated that other types of extrusions may be used. Furthermore, arm 26 may be formed from two or more extrusions or may be combined with intermediate plates or the like to increase the overall height of arm 26, as will be more fully described in reference to FIGS. 8 and 10.

Figure 7A:
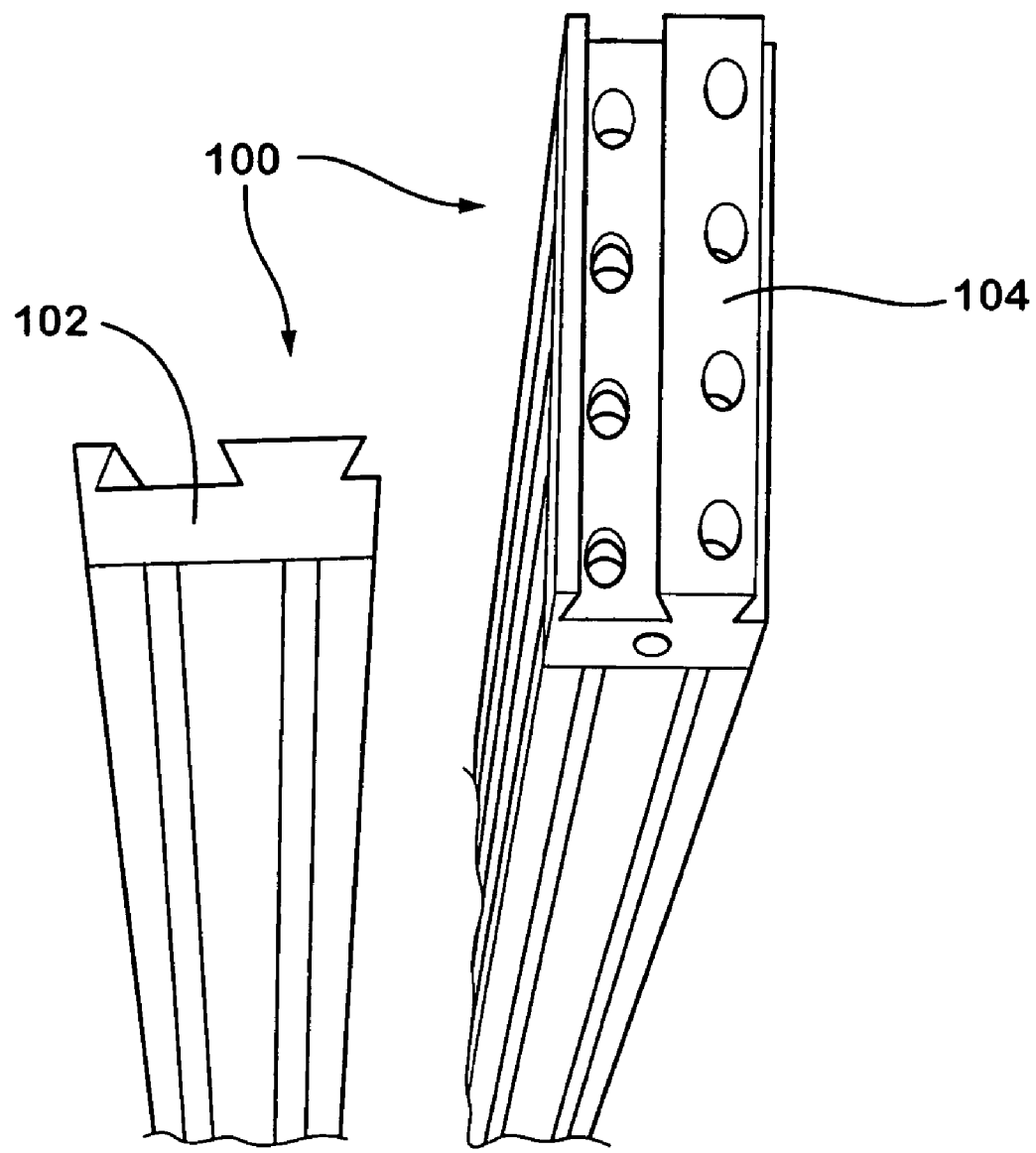
FIG. 7A is a perspective end view of the two arm portions that form the arm of FIG. 7.
Figure 7B:
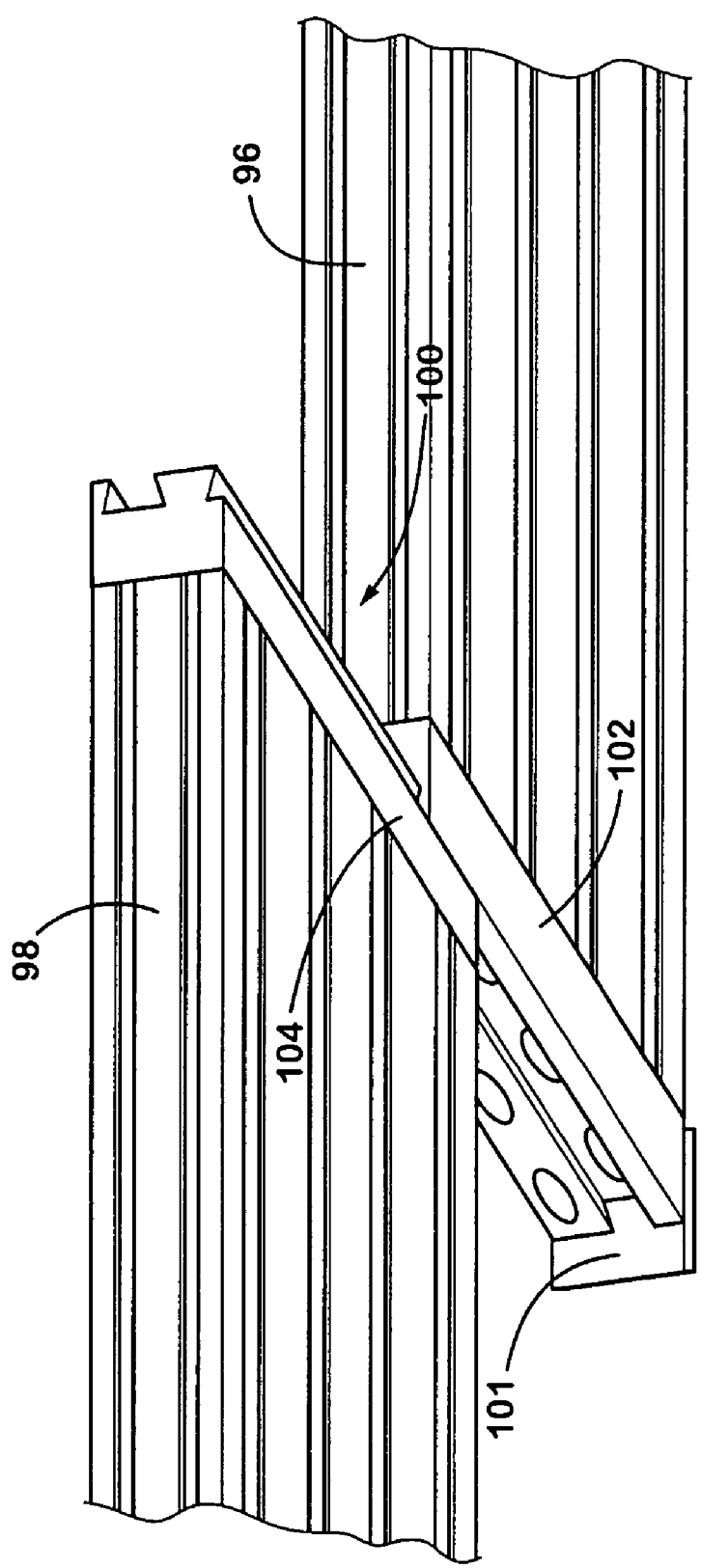
FIG. 7B is a top perspective view of the two arm portions of FIG. 7A interconnected.

As noted above, arm 26 is adapted to facilitate removal of belt 22 and, preferably, without requiring the full disassembly of the diverter assembly. As best understood form FIG. 2, extruded member 32 preferably comprises a pair of extruded sections 96 and 98 that are aligned along the longitudinal axis 26a of arm 26 and are releasably interlocked by a joint 100. Referring to FIG. 7A, joint 100 is formed by a pair of plates 102 and 104 that are respectively mounted to the ends of the extruded sections 96 and 98. Plates 102 and 104 have an interlocking surface formed thereon and, preferably, a slidably interlocking surface formed thereon. In the illustrated embodiment, the slidably interlocking surfaces form an angled dovetail joint. Preferably, plates 102 and 104 have mirror images and are, further, preferably for ease of manufacture and reduction of costs formed from two substantially identical plates with one plate rotated such that its interlocking surface mates with the interlocking surface of the other plate. However, it can be appreciated that plates with non-mirror image locking surfaces may also be used.

Referring again to FIG. 7, joint 100 preferably comprises an angled joint. Further, the angled joint forms an acute clockwise angle (as viewed in FIG. 2) with respect to the longitudinal axis of arm 26. In this manner, when one of the extruded sections 96 or 98 is moved relative to the other extruded section, the joint will guide the respective extruded section along a plane P that is angled with respect to the longitudinal axis 33 of extruded member 32 such that when the respective extruded section is moved it will slide with respect to the other extruded section along plane P. As a result, the extruded section 98 moves along the longitudinal axis toward pulley 54 and the overall length of arm 26 is reduced so that the belt can be quickly and easily removed for replacement or repair. To secure extruded sections 96 and 98 in their aligned positions, the lower end of joint 100 includes a fixed plate or flange 101 that provides a stop, which is either formed on the end of one of the plates 102 or 104 or provided on the lower most extruded section. The other end of joint 100 is releasably locked by a flat plate or washer 100a that is secured over the joint and is secured to one of the extruded sections (96 or 98) by on or more fasteners 100b. It should be understood that other releasable locking mechanisms, such as a clamp, may be used. Thus, with this construction, the need for a splice in the belt is eliminated.

Referring to FIGS. 8 and 9, the numeral 126 designates another embodiment of the arm of the paddle diverter assembly of the present invention. Arm 126 is of similar construction to arm 26 and supports a pair of pulleys 152 and 154 similar to pulleys 52 and 54. In the illustrated embodiment, arm 126 includes an extruded assembly, which is formed from a pair of extruded members 132a and 132b, which are vertically stacked to increase the height of the arm assembly 126. Each extruded member 132a, 132b is formed from a pair of extruded sections 196a, 198a, 196b, and 198b aligned along the longitudinal axis of the arm. With this arrangement, joint 200 is formed by a pair of plates 204 and 206, which are respectively mounted to the distal ends of sections 196a, 196b, and 198a, 198b such that plates 204 and 206 span the height of the respective extruded members forming the extruded assembly 132. Plates 204 and 206 are of preferably similar construction to plates 102 and 104 and provide a releasably interlocking joint between the respective extruded sections and, preferably, an angled dovetail joint.

As best seen in FIG. 10, arm 226 similarly comprises an extruded assembly 232, which is formed from a pair of extruded members 232a and 232b and an interconnecting web 232c, such as-a plate. Similarly, joint 300 is formed by a pair of plates 304 and 306 that are secured to the distal ends of the respective sections 296a, 296b, 298a, 298b of the extruded members 232a and 232b and, further, to the distal ends or edges of the web section or web sections forming web 232c. With the increase in the overall height of arm 226, pulleys 254 and 256 are similarly increased in length along their respective axis 254a, 256a, with the addition of pulley sections 254b, 256b, respectively, which in turn permits an increase in the height of the belt for the paddle diverter assembly.

Figure 10A:
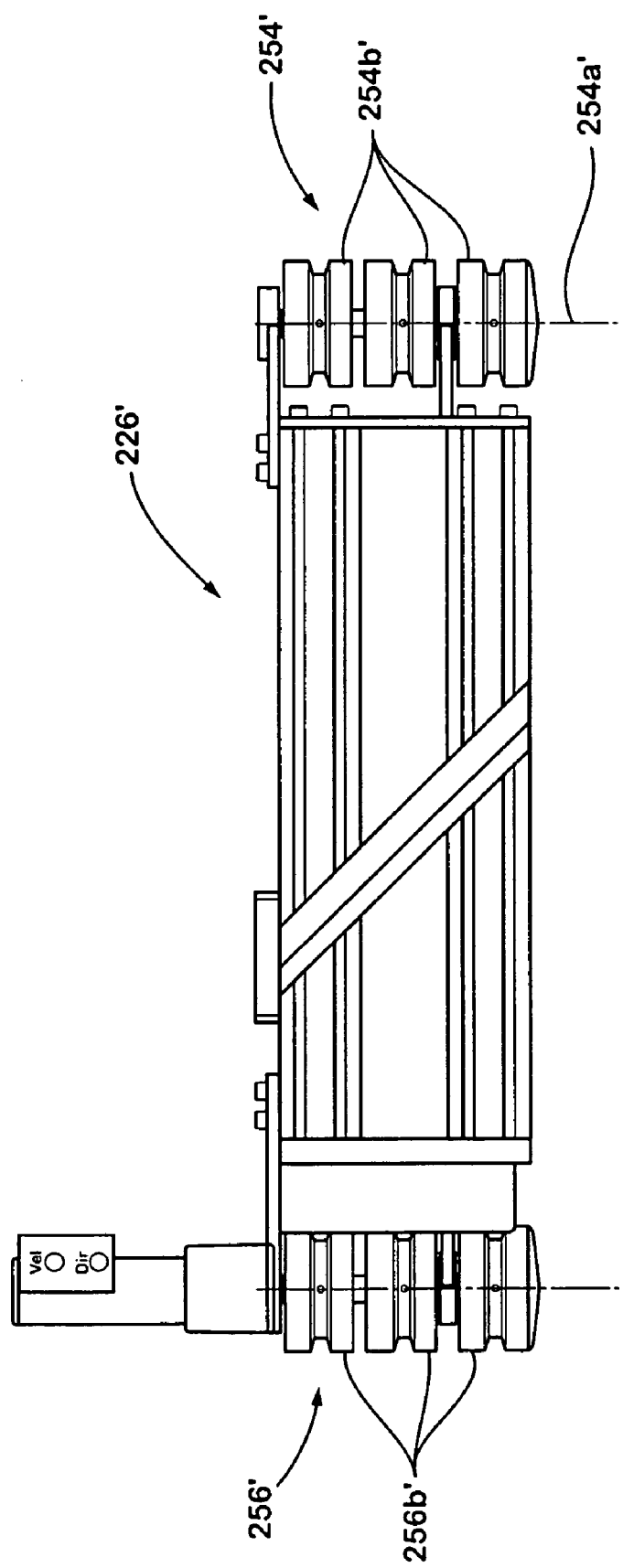
FIG. 10 is a side elevation view of another embodiment of an arm of the paddle diverter of the present invention.

Optionally, the pulleys of the paddle diverter assemblies of the present invention may be formed from a plurality of similar pulley sections. Referring to FIG. 10A, arm 226' includes a pair of pulleys 254' and 256' which are assembled from substantially similar pulley segments 254' and 256b', which provides for a more modular assembly and an assembly that is less costly to build.

The paddle diverter assembly of the present invention may incorporate an arm cover 410, such as illustrated in FIGS. 11, 11A, and 11B. In the illustrated embodiment, cover 410 is an adjustable cover that includes a base member 412, which is fitted over the respective drive pulley of the paddle diverter assembly, and an extendable member 414 which is slidably mounted on the distal portion 416 of base member 412. Base member 412 includes a cylindrical portion 418 and extended sides 420 and 422. Extended side 420 forms a generally horizontal upper wall 420a, with extended wall portion 422 extending from side 420 and forming a sidewall portion. Distal portion 416 includes an upper generally horizontal wall 424 which is spaced lower than horizontal wall 420a to provide a mounting and guide surface for extendable portion 414, which has a similar cross-section to base 412. In this manner, extendable portion 414 may be moved along distal end portion 416 until its upper wall 426 abuts the distal end of upper wall 420, such as illustrated in FIG. 11A, with the distal end of upper wall 420 forming a stop. Optionally and preferably, cover 410 includes an access opening for 428, which is covered by a cup-shaped member 430. Cup-shaped member 430 is provided to accommodate a top mounted driver, described more fully below. As would be understood, therefore, cover 410 is configured as a right handed cover or a left handed cover.

Figure 11D:
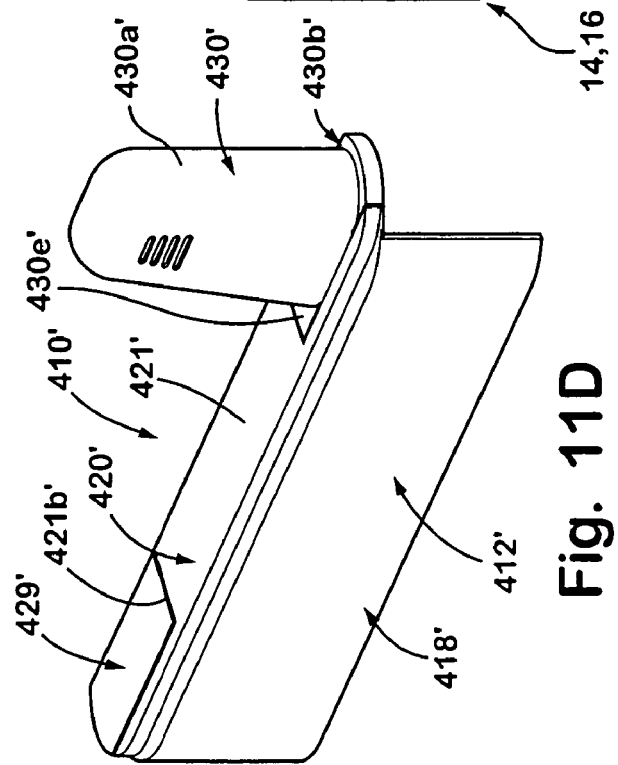
FIG. 11D is a perspective view of another embodiment of the arm cover of the present invention.
Figure 11E:
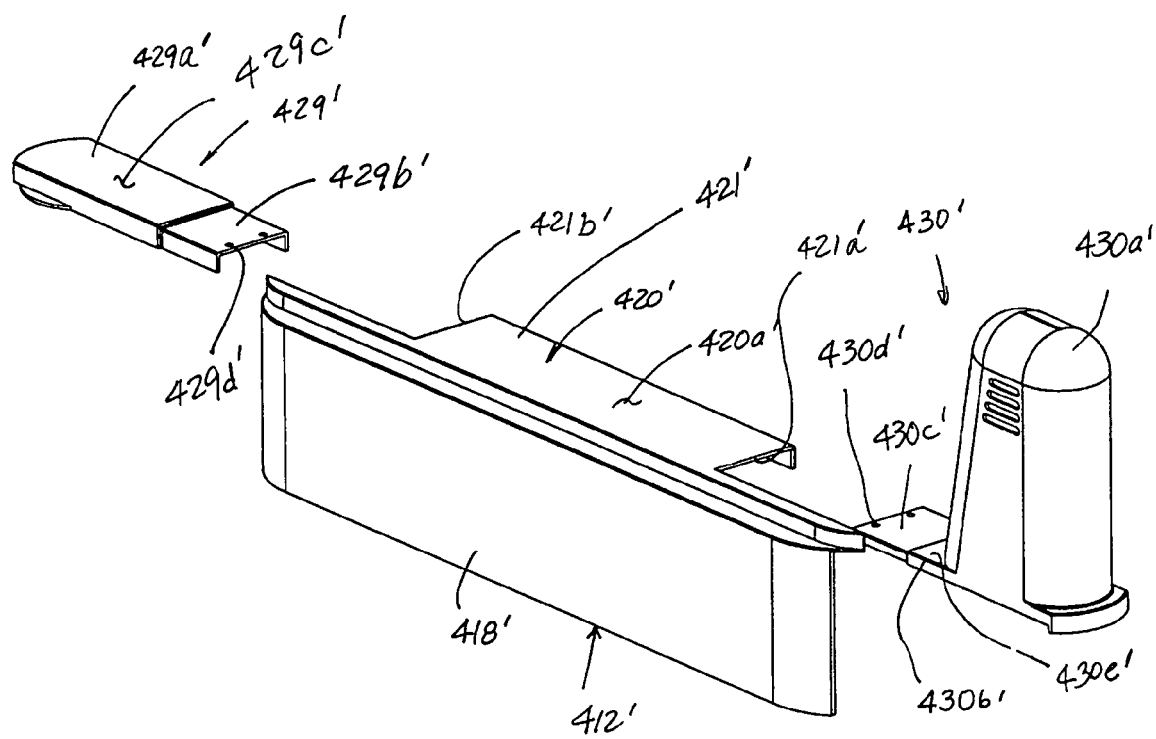
FIG. 11E is an exploded perspective view of the arm cover of FIG. 11D.

Alternately, the cover may be formed as an unhanded cover so that it can be used on either the right arm or the left arm. Referring to FIGS. 11D and 11E, cover 410' comprises an unhanded arm cover. Cover 410' includes a base member 412', which extends along arm 26 and at least partially around the respective drive pulley of the paddle diverter assembly, and removable end portions 429' and 430', which are interchangeable as will be described to reconfigure the cover from a right handed cover to a left handed cover or vice-versa. Base member 412' includes a generally vertical side wall 418' and an upper generally horizontal wall 420', which extend along the arm of the diverter assembly. The opposed ends of side wall 418' are curved or have arcuate portions to extend at least partially around the pulleys of the diverter assembly. Upper wall 420' includes a central portion 421' with terminal ends 421a' and 421b' that terminate inward of the opposed ends of 418' and of the outer ends of wall 420' for receiving portions 429' and 430', as will be described below.

End portion 430' includes a cup-shaped member 430a', which is provided to accommodate a top mounted motor, and a base 430b'. Base 430b' includes a recessed or offset portion 430c' that extends under upper generally horizontal wall 420' of base 412' when mounted to base 412' and, further, is sized so that when extended under wall 420', upper surface 430e' of base 430b' will be substantially aligned and flush with the upper surface 420a' of wall 420'. In addition, recessed portion 430c' is provided with mounting openings 430d' to allow end portion 430' to be fastened to wall 420'.

Cup-shaped member 430a' extends upwardly and is preferably integrally formed with base 430b' to provide a unitary part; though it should be understood that cup-shaped member 430a' and base 430b' may be separately formed and then, preferably, secured together. Cup-shaped member 430a' is located inwardly from the outer end of base 430b', which is sized and configured to align with and match the profile of the upper wall 420' of base 412'. As noted above, central portion 421 of upper wall 420' includes terminal ends 421a' and 421b' that are spaced inwardly from the outer ends of wall 420'. Hence, the upper surface 430e' of base 430b' is preferably sized to extend between a respective terminal end, such as 421a' and the outer ends wall 420'.

End portion 429' includes a base 429a' with a recessed portion 429b', which similarly extends under wall 420' at an opposed end from portion 430'. Furthermore, recessed portion 429b' is sized so that when recessed portion 429b' is extended under wall 420', upper surface 429c' of flange 429a' will be aligned and substantially flush with upper surface 420a' of wall 420' and, further, extend between terminal end 421b' and the opposed outer end of wall 420'. In addition, recessed portion 429b' also preferably includes one or more mounting openings 429d' to allow portion 429' to be secured to base member 412'.

As would be understood, end portions 430' and 429', therefore, have a similar, if not identical footprint, so that they are interchangeable to reconfigure base member 412' between a left handed configuration and a right handed configuration so that cover is in effect "unhanded" and can be used on either the left or right arm of the diverter assembly.

Referring again to FIG. 2A and the first embodiment of diverter assembly 10, pulleys 48 and 74 are driven by a drive system 110. In the illustrated embodiment, drive system 110 includes a first or arm driver, such as motor 111, for driving pivot cylinder 36 and a second or belt driver, such as drive motor 114, for driving shaft 70. Motors 111 and 114 are mounted adjacent conveyor 12 below frame 28 and preferably comprise adjustable speed and reversible motors. Furthermore, suitable motors include servomotors, such as Series HC-KFS from Mitsubishi or are available from Dunkermotoren from Germany. As will be more fully described in reference to a later embodiment in FIG. 2G, a belt drive motor (114') may be mounted directly to the drive shaft 70a below hub 40. It should be understood that other drivers may be used to move the arms, such as cylinders, including pneumatic and/or hydraulic cylinders, and/ or rotary actuators, including pneumatic or hydraulic rotary actuators, such as pneumatic motors, including a servo-controlled pneumatic motors, or linear actuators, such as rack and pinion mechanisms. For example, a rack may be used to rotate a curved rack or gear, which would then provide the rotational motion to the arm. Therefore, it should be understood that the term "driver" is used in its broadest sense and is not limited to a motor. However for ease of description of the preferred embodiments, reference hereinafter will be made to motor or motors.

Motor 111 includes a drive sprocket 112 about which a drive pulley 113 extends to engage drive sprocket 48 mounted on pivot cylinder 36. Second motor 114 similarly includes a drive sprocket 115. A drive belt 116 extends around sprocket 115 for driving drive sprocket 74, which is mounted to shaft 70. Preferably, the arm drive motor 111 includes a switch and potentiometers built into the motor and, further, are coupled to a fault indictor circuit. Furthermore, control system 120 selectively and independently actuates motors 111 and 114. As it would be understood, therefore, the driven belts may be independently driven from arms 26 and, further, paddle diverters 14 and 16 may be independently pivoted between their respective diverting and non-diverting positions.

Optionally, control system 120 includes sensors to detect location and size of the object or articles conveyed on the conveying surface 12a of conveyor 12. For example, control system 120 may include a pair of spaced apart sensors 121a and 121b (FIG. 1A), such as photo eyes. Sensors 121a and 121b detect the leading edge of the article to be diverted and the tailing edge of the article so that the control system may determine the length of the article being diverted and, therefore, may determine the timing needed for the pivoting of the respective paddle diverters assemblies to minimize the time that the respective arms are pivoted across the conveying surface. In this manner, articles may be more closely placed on the conveyor and/or the conveying speed of the conveyor may be increased. As would be understood, therefore, control system 120 may operate paddle diverter assemblies asynchronously to, thereby, increase the throughput of the conveyor system.

Preferably, control system 120 uses servo control to control the position of the arms. In addition, control system 120 preferably includes a servo controller for each arm drive motor (111), which use feedback control loops to determine the position of the respective diverter assembly arms. This enables control system 120 to control the degree of rotation of the respective diverter assembly arms and, further, the direction of the rotation of the diverter assembly arms. For example, control system 120 includes a separate servo amp and overtravel switches 122a and 122b for each arm. Suitable servo amplifiers include Series MR-J2S from Mitsubishi. In addition, this enables control system 120 to control the drivers to sequentially move the diverter arms or to individually move the diverter arms. For example, in some applications, only one arm is moved.

Referring to FIG. 2F, switches 122a and 122b are preferably mounted to arm 26 and actuated when triggered, for example, when aligned with metal ramps or "dogs" or the like, which are mounted to hub 40 at locations that correspond to the home position for the arm and the overtravel position for the arm. Since the arms are moved between their respective home or non-diverting positions and their diverting positions without the use of mechanical stops, the orientation of the diverter assembly is unlimited by the physical configuration of the system and, instead is controlled by control system 120. Moreover, the noise generated by diverter assemblies 14, 16 is significantly reduced over the prior art.

Figure 2G:
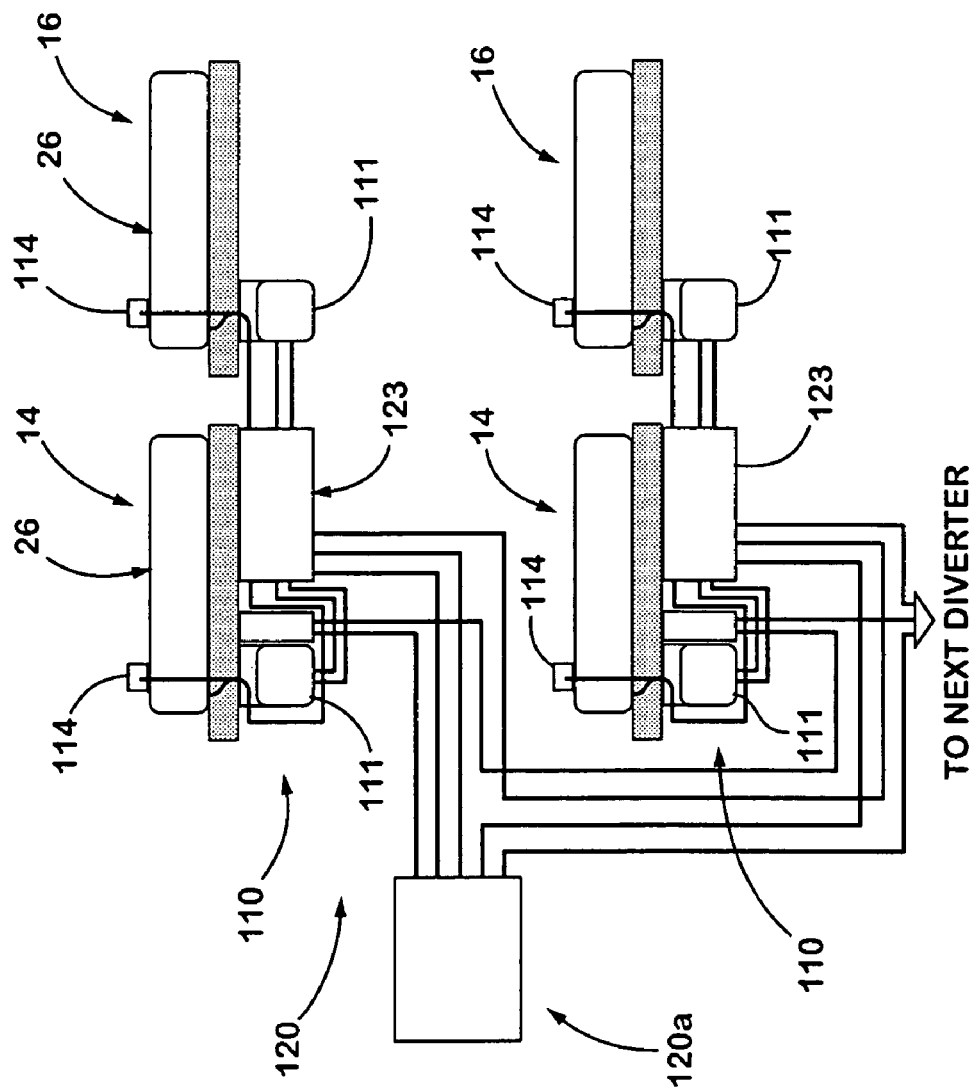
FIG. 2G is a schematic drawing illustrating the control system of the present invention.

Referring to FIG. 2G, each pair of paddle diverter assemblies includes a control unit 123, which includes the respective servo amps for each paddle diverter assembly. Where multiple pairs or sets of diverter assemblies are used, each control unit 123 may be connected, for example, by a "daisy chain" to a central controller 120*a* through wiring and Ethernet lines, which significantly reduces the field wiring.

Figure 2H:
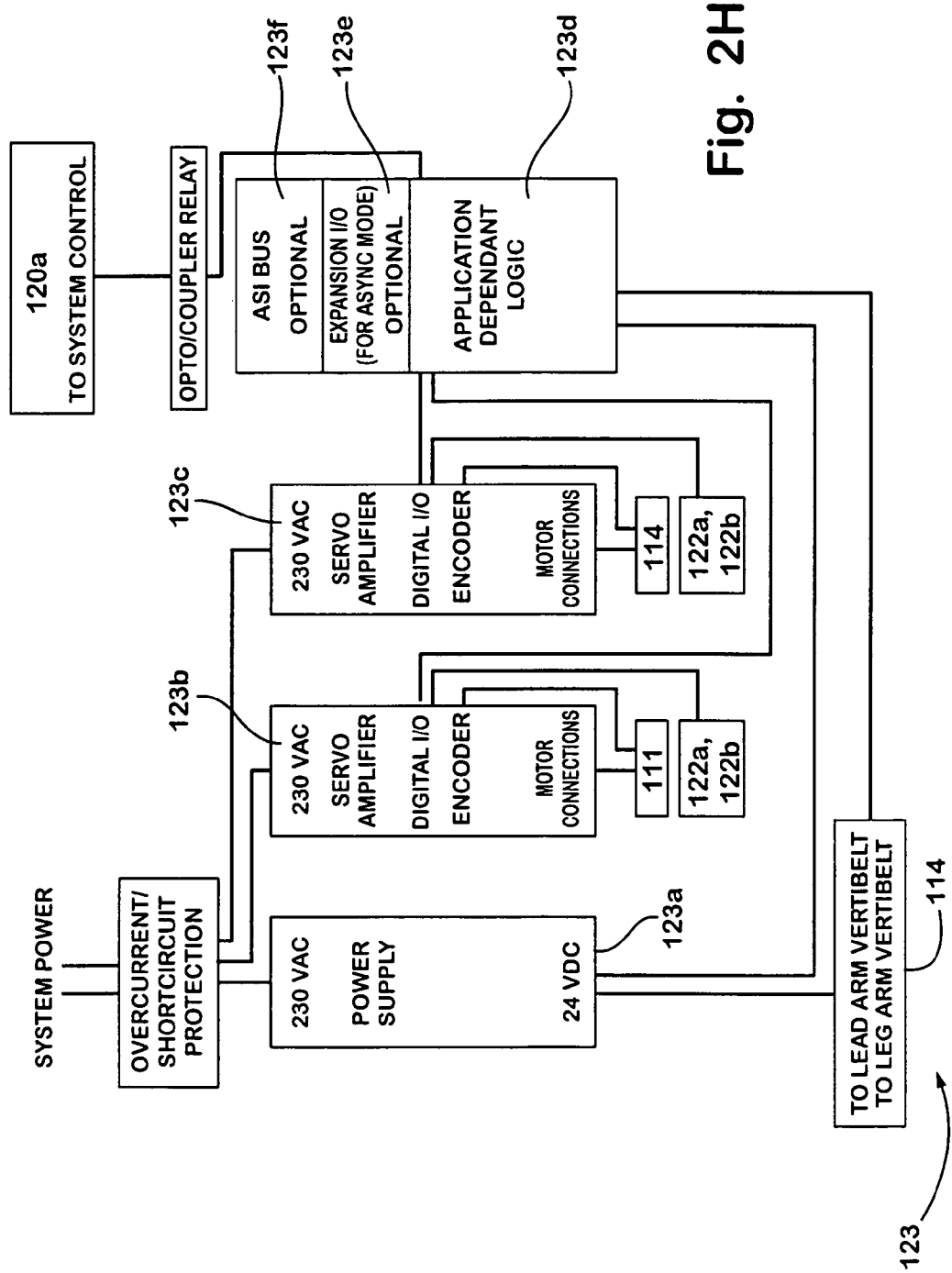
FIG. 2H is a schematic view of a control unit for each diverter assembly.

Referring to FIG. 2H, each control unit 123 includes a power supply 123*a* and a servo amp 123*b* and 123*c* for each diverter assembly 10. In addition, control unit 123 includes application dependent logic 123*d*, which is in communication with the servo amps and, further, with the arm drive motors (111) of the respective arms (26). Servo amps 123*b* and 123*c* also communicate with the respective arm drive motors (motors 111) and, further, to the overtravel and home switches of the respective arms (122*a*, 122*b*). As noted above, arms 26 may be driven asynchronously or may be driven synchronously. For example, for asynchronous operation, application dependent logic 123*d* handles the timing of the respective arms (the lead arm and the lag arm). For example, application dependent logic 123*d* receives input from sensors 121*a* and 121*b* from which the application dependent logic determines the length of the object being diverted to determine a time constant. The time constant varies with each size of article being diverted and is used to determine the lag time between driving the lead arm and the lag arm.

Optionally, control unit 123 may include a module 123*e* that can provide additional access ports to application dependent logic 123*d* to vary the application dependent control. For example, in an asynchronous mode, the application dependent logic 123*d* may be separately and independently in communication with the arm drive motors of the leading lag arms. In a synchronous mode, for example, a single connection may be used to control both arms.

In addition, control unit 123 may incorporate an actuator sensor interface 123*f* (ASI Bus). Actuator sensor interface 123*f* may provide additional information about the respective components of each paddle diverter assembly.

Furthermore, control unit 123 preferably includes an opto coupler/relay 123*g*, which isolates the main processor from potential electrical damage from control unit 123. Opto coupler relay 123*g* interfaces with application dependent logic 123*d* and detects when an alarm or fault mode occurs to trigger a supervisory controller in the main control system (120*a*). Opto coupler relay 123*g* provides a hardware indicator to the main control system of whether the diverter assembly, namely, the arm drive motor is healthy or not so that the main control system can cut the power to the drive arm motor and also the belt drive motor.

Furthermore, given that the arm drive motors are servo controlled, when the respective arms of the diverter assemblies impact an article, the control system will permit the diverter to move away from the diverting position to absorb some of the impact of the article to therefore reduce the impact on the article being diverted. In other words, the control system provides an electrical or electronic spring for the diverter assemblies so that the output shaft of the arm drive motor of an arm may be temporarily rotated in an opposite direction from its driving direction against the force of the magnetic coil in the motor, which then is overcome by the electromagnetic field in the coil to return the arm to its diverting position.

In addition, each of the respective arms of the diverter assemblies may include an impact plate or spring mounted to the arm to also absorb some of the impact from the article. Referring again to FIG. 1 and to FIGS. 2C–2E, spring 122 comprises a plate member 124, such as a spring steel plate, which extends along the longitudinal axis 26*a* of arm 26. Preferably positioned behind plate member 124 is a cushioning material 126, such as foam or the like, which further improves the impact absorbing ability of spring 122. Cushioning material 126 may e mounted to member 32 by a mounting plate 127, such as a plastic mounting plate, with the cushioning member 126 secured to the mounting plate by, for example, adhesive. Spring 122 is mounted on one end to extruded member 32 by a plurality of fasteners 122*a*, which extend into and engage the respective grooves, for example grooves 32*c* of extruded member 32. The distal end of spring 122 is bent inwardly toward extruded member 32 and cantilevered so that when plate member 124 is compressed, the distal end of plate member 124 is free to extend along the longitudinal axis 26*a* of arm 26. Furthermore, plate member 124 includes a longitudinal groove 125, which receives the rib or ribs 22*a* of the belt 22 to provide a guide and additional vertical support to the belt 22. Optionally plate member 124 may comprise two or more plate sections 124*a* and 124*b* to thereby form the groove 125 there between. In addition to forming an impact-absorbing member, spring 122 can also be used to pre-tension belt 122.

Figure 12:
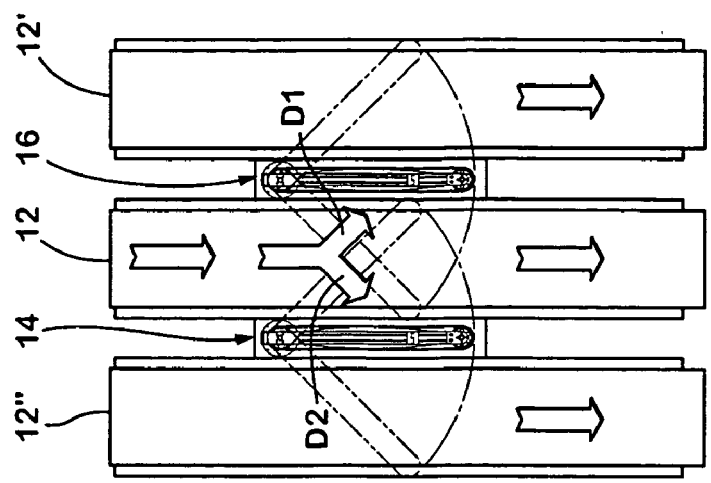
FIG. 12 is a plan view of a conveyor system incorporating diverter assemblies of the present invention being used as a positive bi-directional sorter.

As would be understood from the foregoing description, paddle diverter assemblies 14 and 16 may be used to divert articles from either side of the conveyor, such as illustrated in FIG. 12. In the illustrated embodiment, paddle diverters 14 and 16 are positioned between adjacent conveyor sections 12, 12', and 12" such that their respective arms can extend across the conveying surface of either adjacent conveyor. In the particular illustration, the control system for the paddle diverter 14 is programmed to permit the respective arm of paddle diverter assembly 14 to pivot across the conveying surface of conveyor 12 as well as the conveying surface of the adjacent conveyor section 12". Similarly, the control system for paddle diverter assembly 16 is programmed to move its respective arm over conveyor 12 or conveyor 12'. In this manner, products conveyed on conveyor 12 and flowing in the conveying direction as indicated by arrow Al may be diverted either in the direction D1 by pivoting the respective arms of paddle diverters assemblies 14 and 16 in a counter-clockwise direction (as viewed in FIG. 12) or in a diverting direction D2 by pivoting the arms of the paddle diverter assemblies 14 and 16 in a clockwise direction, as will be understood by those skilled in the art.

Figure 13:
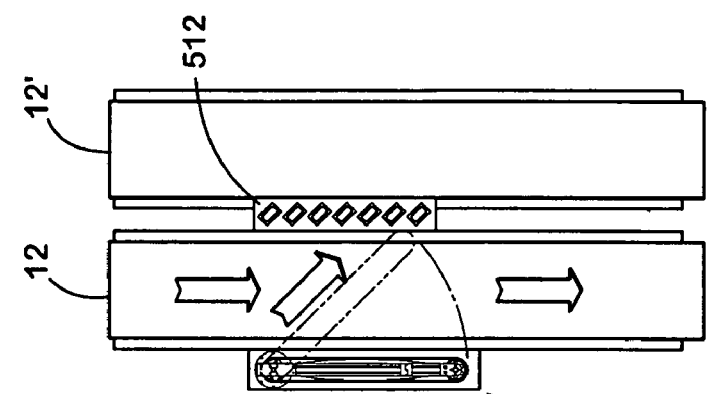
FIG. 13 is a plan view of a diverter system incorporating a single diverter assembly of FIG. 2 diverting onto a parallel conveyor.

Referring to FIG. 13, it should also be understood that paddle diverter assemblies 14 or 16 may be used in conjunction with other diverting devices, such as pop-up rollers 512, in which case, the arm of the respective paddle diverter assembly extends substantially across the full width of conveyor 12 to divert the articles onto rollers 512 so that the rollers 512 can transfer the diverted article onto the adjacent conveyor section 12'.

Figure 14:
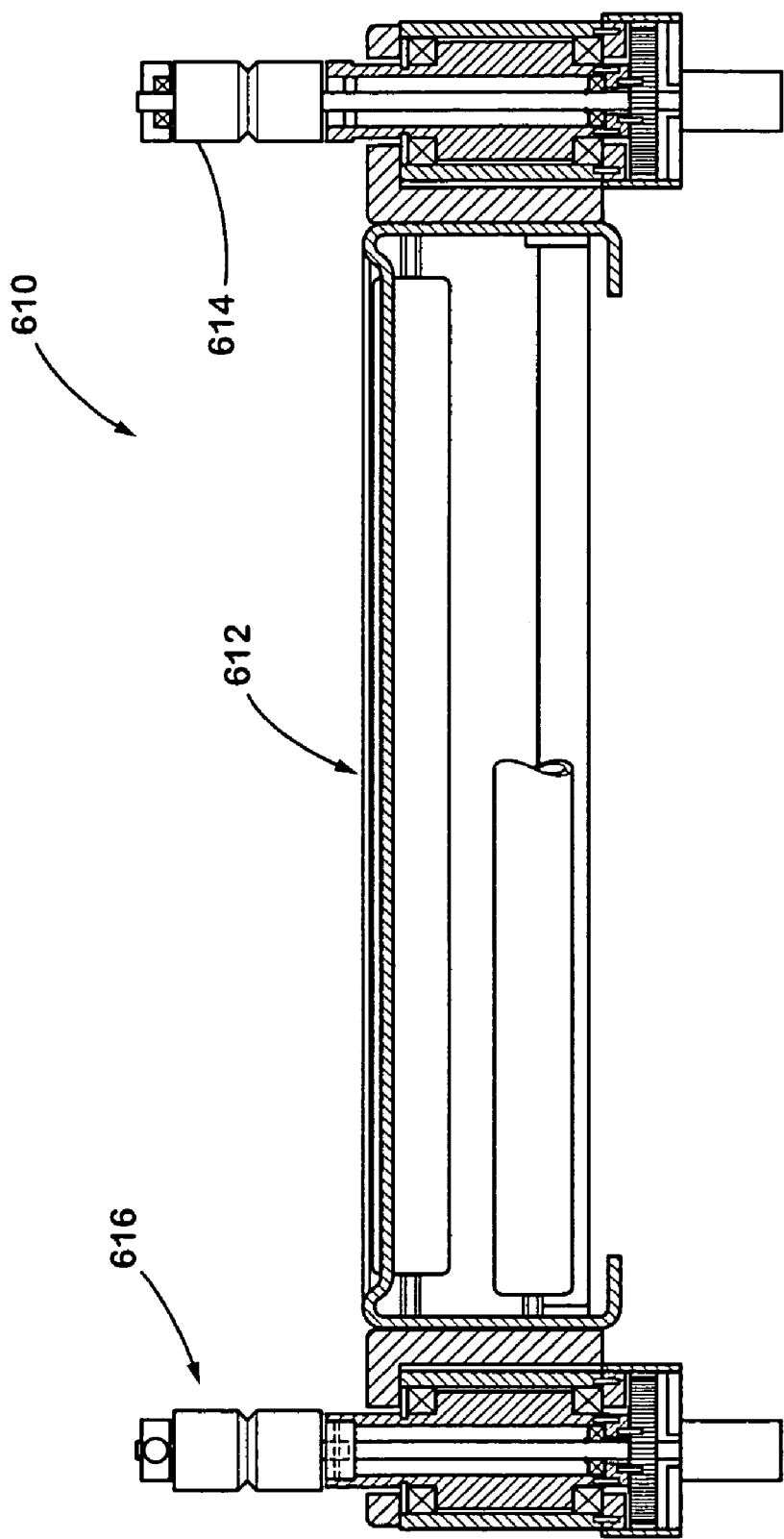
FIG. 14 is a cross-section view similar to FIG. 4 illustrating another embodiment of the diverter assembly of the present invention.

Referring to FIG. 14, the numeral 610 generally designates another embodiment of the diverter system of the present invention. Diverter system 610 includes conveyor 612 (similar to conveyor 12) and a pair of diverter assemblies 614 and 616, which are also similar paddle diverter assemblies 14 and 16. For ease of reference, the following description will be limited to paddle diverter 614, which for ease of assembly and for reduction in cost is of similar or substantially identical construction to paddle diverter 616.

Referring to FIGS. 15 and 16, paddle diverter assembly 614 is of similar construction to paddle diverter 14 and includes an arm 626, which supports a pair of pulleys 652 and 654 for supporting a driven surface, such as a drive belt 622. Arm 626 is formed by upper and lower plate members 632a and 632b, which are interconnected by vertical supports 633a and 633b. Pulley 654 is mounted on a drive shaft 654b, which is journaled in upper and lower plate member 632a and 632b by bearings 668 to thereby rotatably mount pulley 654 about axis 654a. Pulley 652 is mounted on and coupled to a drive shaft 670, which is journaled in upper plate member 632a by bearing 672 on one end and is journaled in pivot cylinder 636 by bearings 673. Drive shaft 670 projects through pivot cylinder 636 to be driven by a motor 671, which is directly drivingly engaged with drive shaft 670.

In the illustrated embodiment, pivot cylinder 636 extends through an opening 628a provided in diverter assembly frame 628 and into a hub 640, which is mounted to frame 628 by a plurality of fasteners 640a. For details of diverter assembly frame 628, reference is made to frame 28. Hub 640 includes a plurality of roller bearings 644, which journal pivot cylinder 636 in hub 640. The distal end of pivot cylinder 636 projects through hub 640 and is coupled to a drive pulley 648, which is similarly coupled by a belt or the like to a drive pulley 715 of a second motor 714, which is controlled along with motor 671 by a control system similar to control system 120.

As best seen in FIG. 15, motor 714 is mounted to diverter assembly frame 628 by a bracket 714a. It should be understood, further, that motor 671 may be mounted on top of arm 626 to the upper end of shaft 670 to reduce the vertical extent of diverter the diverter assembly below frame 628, which may be more suitable in conveyor systems that have a lower bed height.

Referring to FIG. 16, belt 622 is of similar construction to belt 22 and comprises a closed loop belt with an inwardly extending rib or plurality of ribs to provide vertical guide surfaces for pulley 652 and 654. In addition, support arm 626 includes intermediate members 632c and 632d positioned between upper and lower plate members 632a and 632b. In the illustrated embodiment, members 632c and 632d comprise channel members that are mounted to vertical supports 633a and 633b of arm 626. In addition, each intermediate member 632c, 632d includes an elongate transverse groove 632d' and 632c', which provides additional support to belt 622 at least on the impact side of the respective arm. It should be understood, however, that intermediate member 632c and 632d may be provided on either side of vertical support 633a and 633b so that the diverter arm may provide the diverting surface on both sides of arms 626. Adjustment of the belts tension is achieved by mounting shaft 654b in a slotted opening 631 (FIG. 16) provided in upper plate member 632a.

Figure 17:
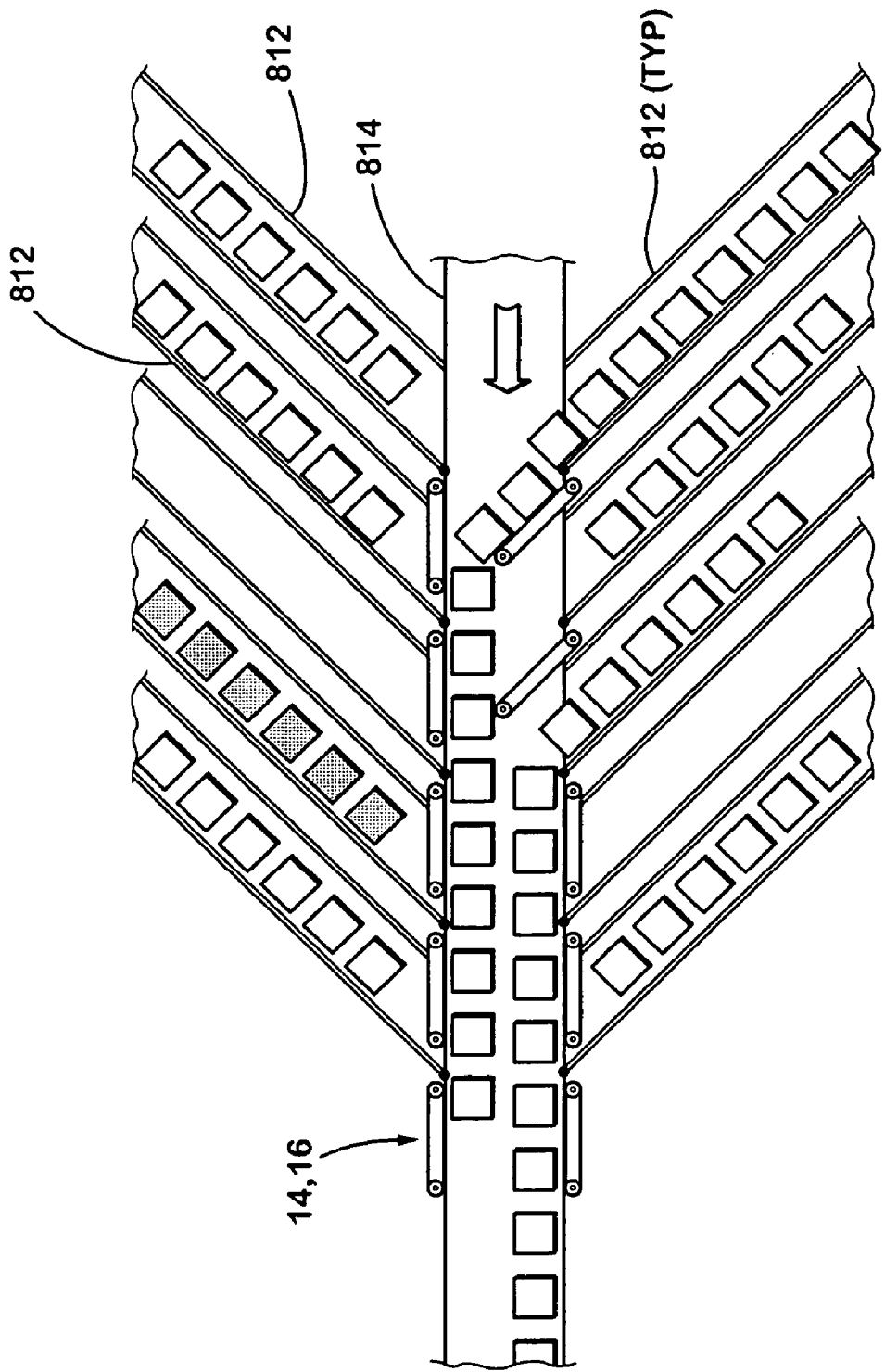
FIG. 17 is a plan view of a merge system incorporating diverter assemblies of the present invention.

As would be understood from the foregoing description, the paddle diverter assemblies of the present invention may be used in a variety of different configurations. Referring to FIG. 17, diverter assemblies 14 may be used in groups and positioned in along one or more sides of a conveyor to provide a selectively controlled merge of products from incoming conveyors 812 to a central main conveyor 814. As will be understood by the illustration, diverter assemblies 14 may be used to block the flow of articles from the input conveyors or may be pivoted to open the flow of the articles from incoming conveyors so that the articles can be merged with the articles conveyed on conveyor 814.

Figure 18:
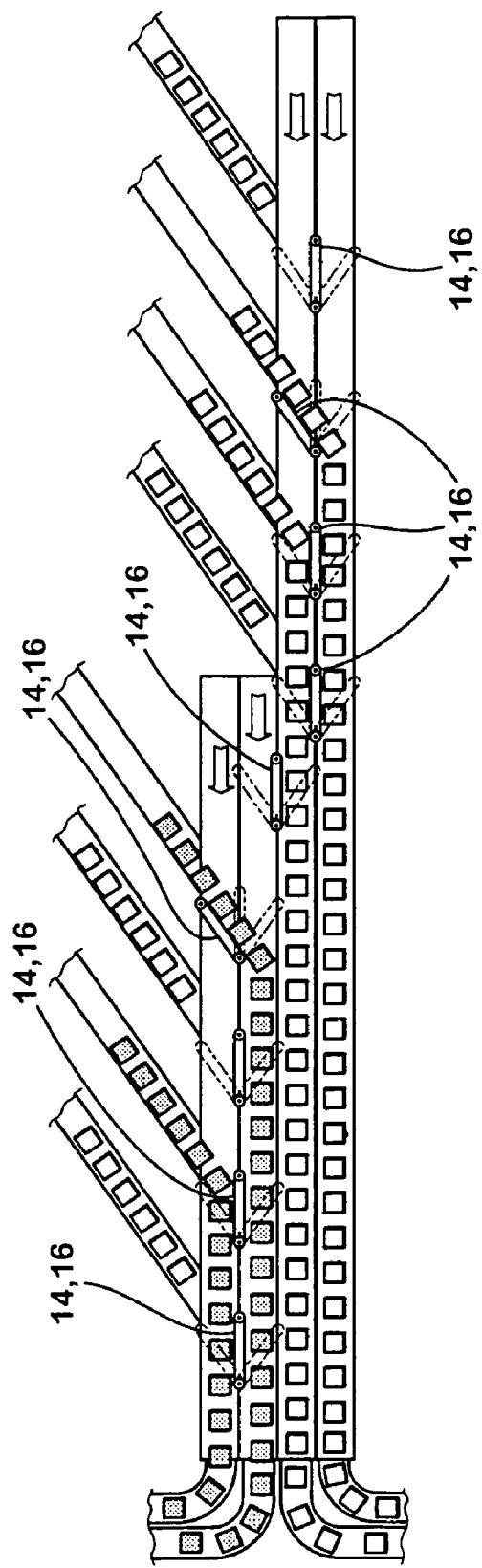
FIG. 18 is a plan view of a multi-lane merge system incorporating diverter assemblies of the present invention.
Figure 19:
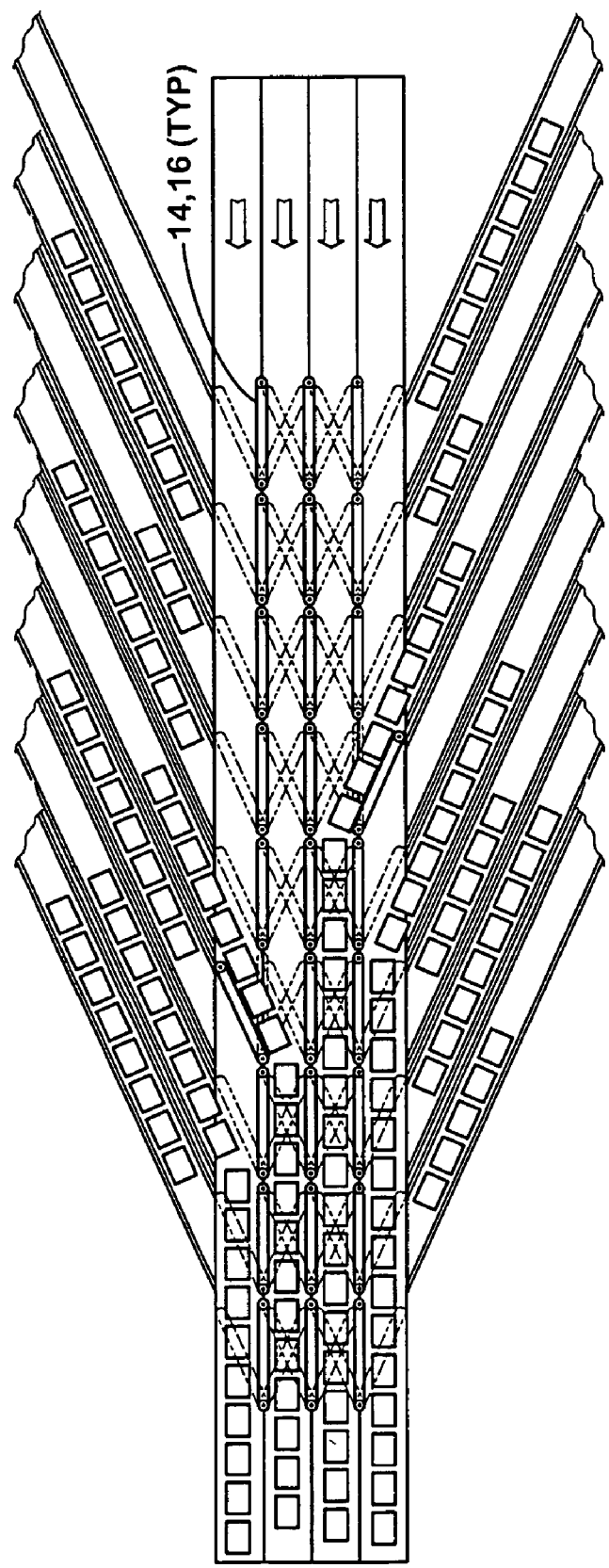
FIG. 19 is a plan view of yet another multi-lane merge system incorporating diverter assemblies of the present invention.
Figure 21:
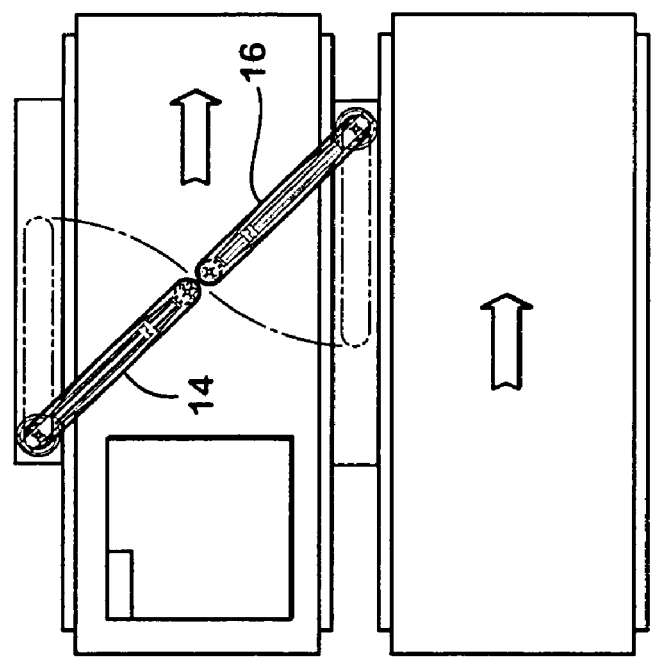
FIGS. 20–25 illustrate a plan view of a conveyor system incorporating the paddle diverter assemblies of the present invention to provide a right angle transfer diverter.
Figure 20:
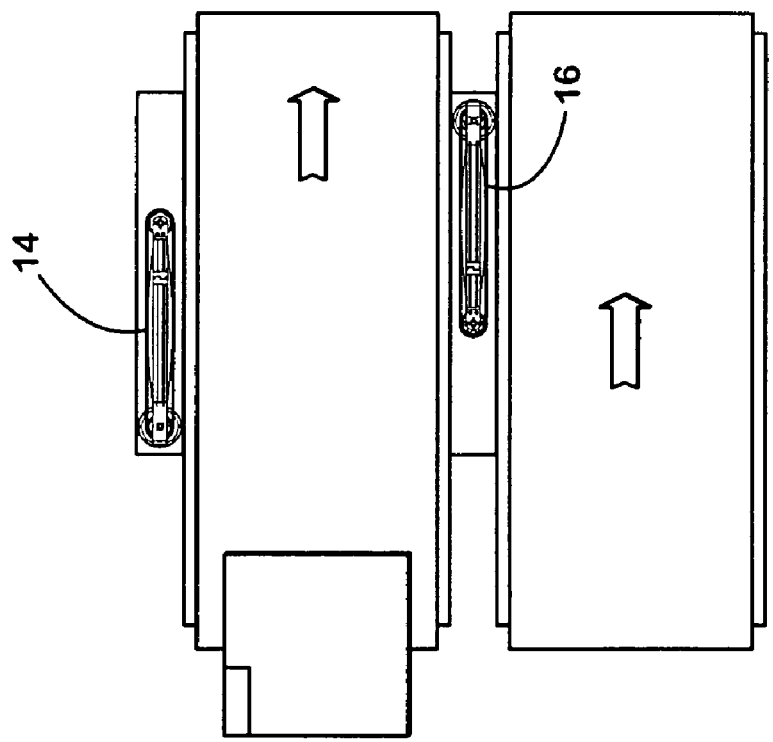
Figure 23:
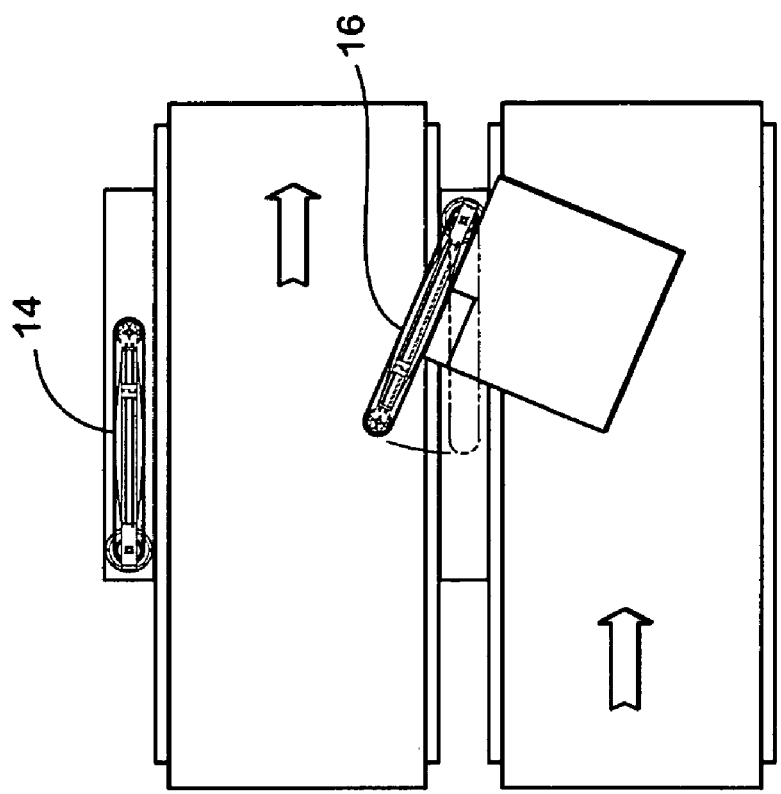
Figure 22:
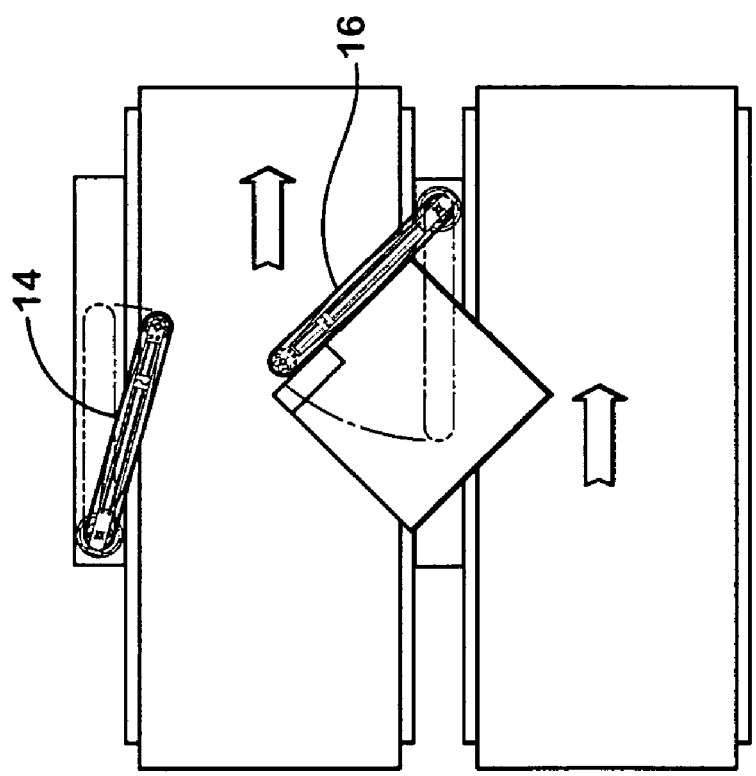
Figure 25:
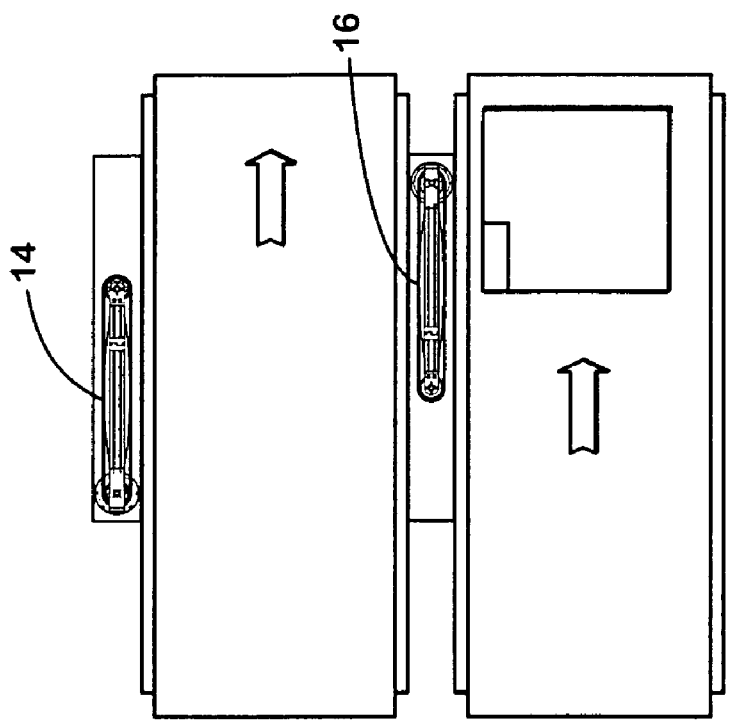
Figure 24:
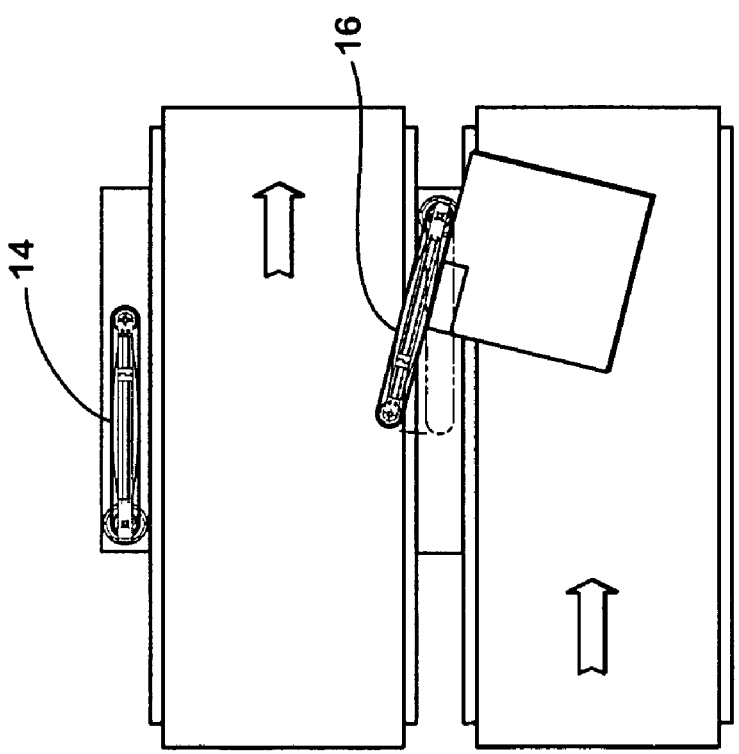

Similarly, referring to FIGS. 18 and 19, diverting assemblies 14, 16 may be used in groups to provide multi-lane merges. As best seen in FIGS. 20–25, paddle diverting assemblies 14, 16 may be used as right angle transfer mechanisms. As can be seen, the asynchronous control of paddle diverter assembly 14, 16 permits the upstream diverter assembly to move back to its home or non-diverting position before the article is transferred over to the adjacent conveyor or the like so that articles can be conveyed more closely on the conveyor.

Figure 26:
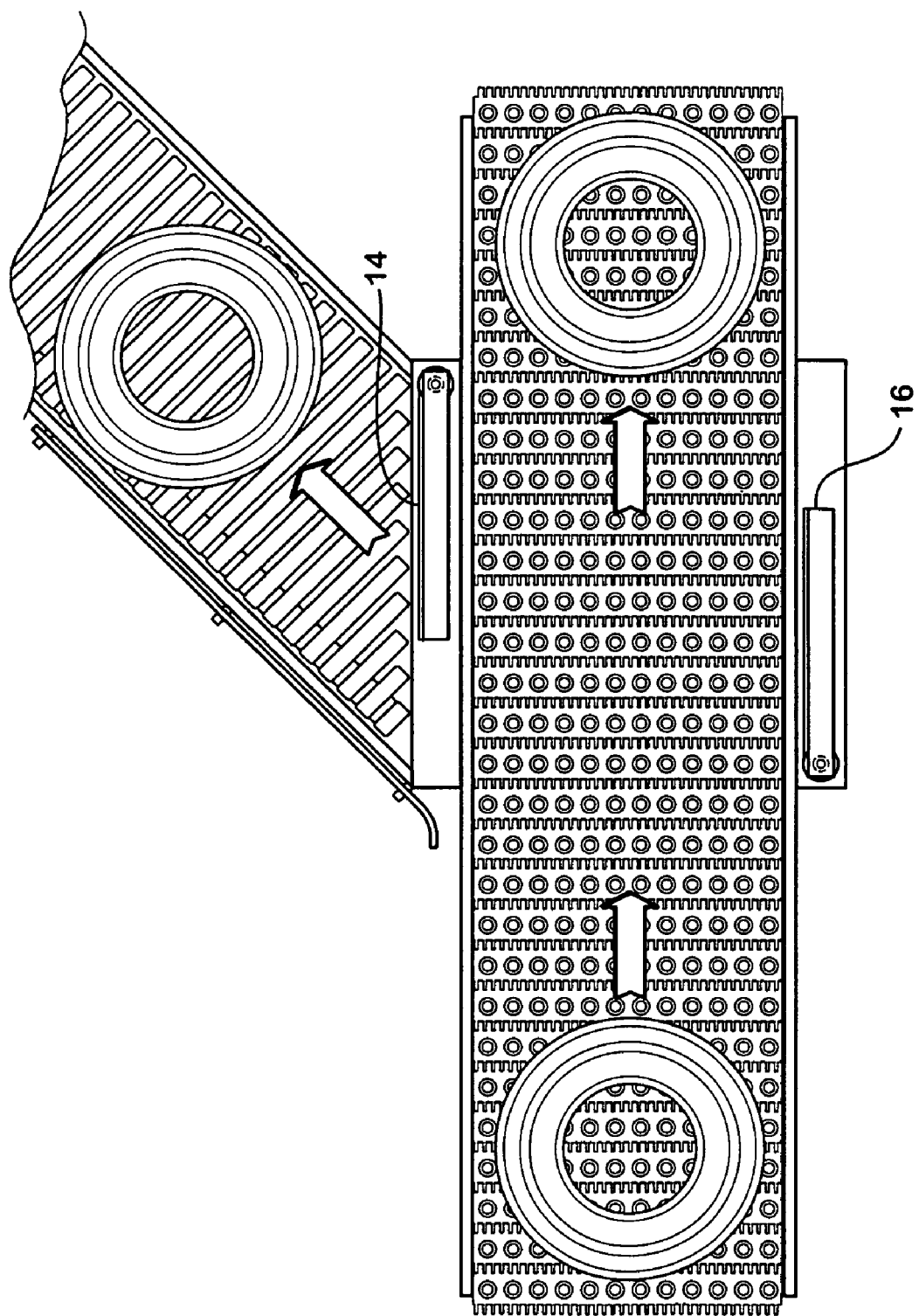
FIG. 26 is a plan view of a diverter system for tires incorporating the paddle diverter assembly of the present invention.
Figure 29:
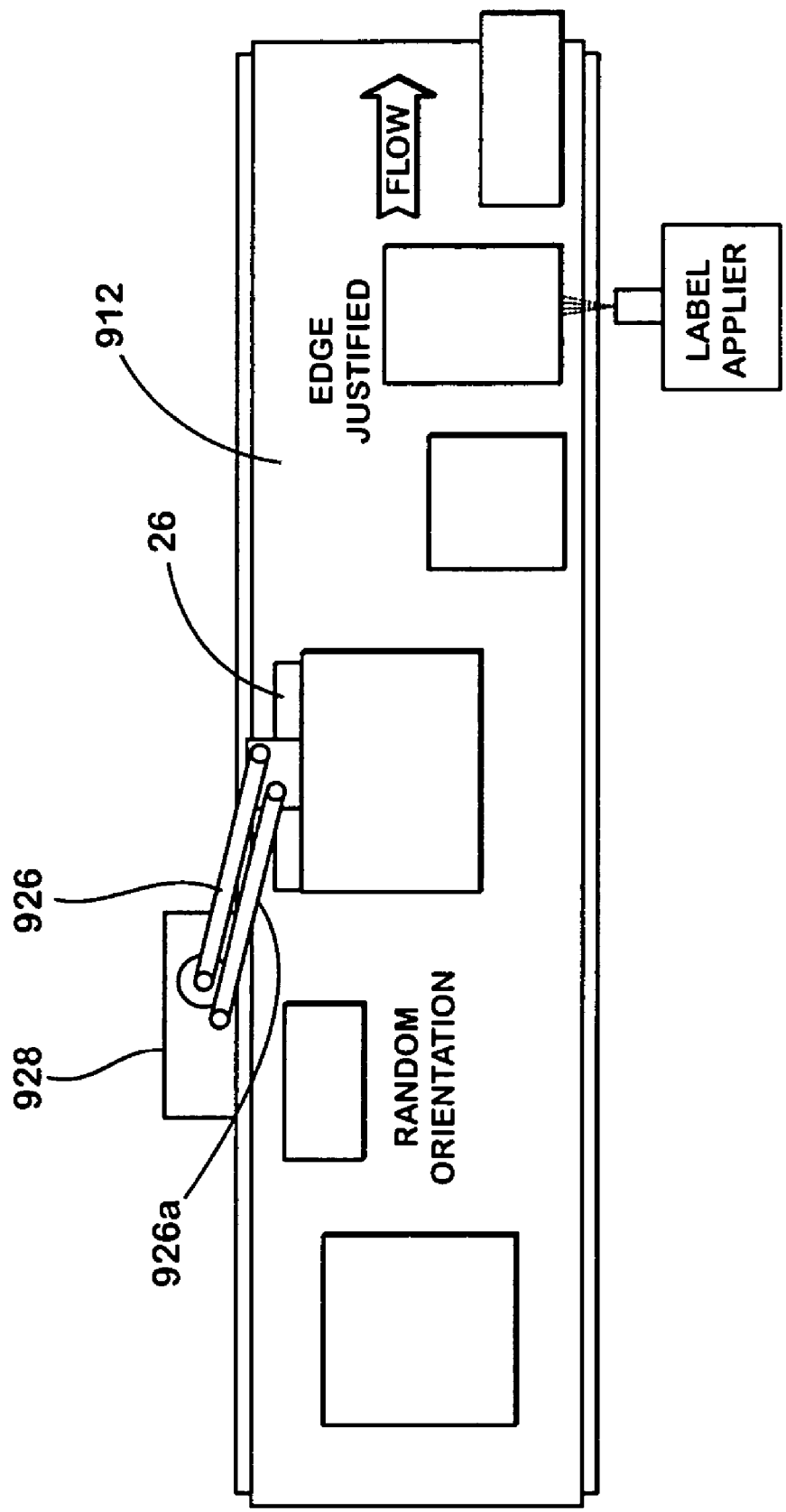
FIG. 29 is an alternate embodiment of the paddle of the edge justifier illustrating the paddle without a drive belt.

Referring to FIG. 26, paddle diverter assembly 14 is particularly suitable for diverting objects with irregular or difficult configurations, such as tires. Furthermore, in this and other similar applications the drive belt may be eliminated.

Referring to FIGS. 27 and 28, diverter assembly 14 or 16 may also be used as a justifier, such as an edge justifier, to move or shift articles on conveyor 912, for example, to one side of the conveyor. In this particular application, arm 26 may be mounted on the ends of a drive arm 926 and a linkage arm 928. In this application, as would be understood by those skilled in the art, the motor (not illustrated) for driving the diverter arm belt is mounted on top of one of the arm mounting brackets 956 or 960, with the shaft of the drive pulley 952 or 954 extending upwardly through the mounting bracket for engagement with the motor. For further details of the construction of arm 26, reference is made to the first embodiment.

As best seen in FIG. 27, drive arm 926 and linkage arm 926a are pivotally mounted to a medial portion of arm 26 and pivotally mounted by a mounting plate 930, which is secured, such as by fasteners, to the upper side of extruded member 32. Similar to the first embodiment, arm 26 includes a spring 122 mounted to member 32. In the illustrated embodiment, spring 122 is provided only on one side, though it should be understood that a spring 122 may be provided on both sides of arm 26.

Drive arm 926 is driven by a motor 915 (shown in phantom), which is preferably mounted below frame 928, which is of similar construction to frame 28. Linkage arm 926a is pivotally mounted at its proximal end to frame 928 and at its distal end to arm 26 and together with drive arm 926 move arm 26 across the conveying surface of conveyor 912 in an arcuate path while maintaining arm 26 generally parallel to the direction of flow of conveyor 912. As best seen in FIG. 28, the drive belt on arm 26 may be eliminated and replaced with an impact absorbing member 22', such as a nylon or Teflon pad or an impact plate supported over an impact absorbing material, similar to spring 122.

While several forms of the invention have been shown and described, other forms will now be apparent to those skilled in the art. For example, although illustrated as a symmetrical assembly, arms 26 of diverter assemblies 14 and 16 may have different lengths with their ends generally meeting at a location offset from the center of the conveying surface. Furthermore, the various aspects of the diverter assemblies may be combined with other features not specifically illustrated herein and, further, the diverter assemblies of the present invention may be used in combination with non-belt conveyors, such as illustrated in FIG. 26.

Additionally, the arm of the respective diverter assembly may be used in a horizontal application, such as in a pop-up diverter. Furthermore, the releasable interlocking feature of the extruded sections forming the arm may be used to releasably interlock sections of conveyor beds, including conveyor beds formed from extruded members and other types of members, such as a belt conveyor or a dual or quad-sorter belt conveyor section, to facilitate removal of the conveyor belt. In addition, a dual joint insert may be used where one of the joints forms an acute clockwise angle with respect to the longitudinal axis of the arm or conveyor bed and the other joint forms an obtuse clockwise angle with respect to the longitudinal axis so that the two joints form a wedge shape insert that can be removed to shorten the arm length or conveyor bed length to facilitate the belt removal.

As previously noted, other types of drivers may be used to move the arms, such as cylinders, including pneumatic and/or hydraulic cylinders, and/ or rotary actuators, including pneumatic or hydraulic rotary actuators, such as pneumatic motors, including a servo-controlled pneumatic motors, or linear actuators, such as rack and pinion mechanism. For example, a linear rack may be used to rotate a curved rack or gear, which would then provide the rotational motion to the arm. Therefore, it should be understood that the term "driver" is used in its broadest sense and is not limited to a motor.

Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

The embodiments of the invention in which an exclusive property right or privilege is claimed are defined as follows:

1. A paddle diverter assembly comprising:
   an arm; and
   an actuator for moving said arm from a home position to a diverting position, said actuator being adapted to permit said arm to move away from the diverting position upon impact with an object to be diverted to thereby absorb at least some of the impact between the arm and the object being diverted and adapted to return said arm to said diverting position by an electromagnetic field.

2. The paddle diverter assembly according to claim 1, wherein said arm comprises a driven diverting surface.

3. The paddle diverter assembly according to claim 2, wherein said driven diverting surface comprises a drive belt.

4. The paddle diverter assembly according to claim 1, wherein said actuator extends downwardly from said arm no more than 12 inches.

5. The paddle diverter assembly according to claim 1, wherein said actuator comprises a motor and a servo controller selectively powering said motor, said motor permitting said arm to move away from the diverting position upon impact with the object and forming an electric spring.

6. The paddle diverter assembly according to claim 1, wherein said arm includes a spring, said spring deflecting to absorb impact when said arm impacts the object being diverted by said arm.

7. The paddle diverter assembly according to claim 6, wherein said spring comprises a plate spring.

8. The paddle diverter assembly according to claim 7, wherein said arm includes a medial portion, and said spring being provided at said medial portion.

9. The paddle diverter assembly according to claim 8, wherein said plate spring includes a longitudinal extent, said arm having a longitudinal axis, said longitudinal extent extending along said longitudinal axis.

10. The paddle diverter assembly according to claim 9, wherein said arm comprises a driven diverting surface.

11. The paddle diverter assembly according to claim 10, wherein said driven diverting surface comprises a driven belt.

12. The paddle driver assembly according to claim 3, wherein said arm supports belt pulleys for supporting said drive belt.

13. The paddle diverter assembly according to claim 5, wherein said arm comprises a first arm, said diverter assembly in combination with a conveying surface and a second arm on an opposed side of said conveying surface from said first arm, and a control system, said control system including said servo controller and a second motor for moving said second arm from a home position to a diverting position, and said control system operable to move said first arm and said second arm asynchronously.

14. A paddle diverter assembly comprising:
   an arm, said arm comprising a driven diverting surface, said driven diverting surface comprising a drive belt;
   an actuator for moving said arm from a home position to a diverting position, said actuator being adapted to permit said arm to move away from the diverting position upon impact with an object to be diverted to thereby absorb at least some of the impact between the arm and the object being diverted;
   wherein said arm includes a spring, said spring deflecting to absorb impact when said arm impacts the object being diverted by said arm, said spring comprising a plate spring;
   said arm including a medial portion and a lougitudinal axis, and said spring being provided at said medial portion and having a londtudinal extent, said longitudinal extent extending along said longitudinal axis of said arm; and
   wherein said plate spring includes a longitudinal groove extending along said longitudinal extent, said drive belt having a rib, said rib extending into said groove wherein said groove provides vertical support to said drive belt.

15. A paddle diverter assembly comprising:
   an arm, said arm comprising a driven diverting surface, and said driven diverting surface comprising a drive belt, said arm supporting belt pulleys for supporting said drive belt;
   an actuator for moving said arm from a home position to a diverting position, said actuator being adapted to permit said arm to move away from the diverting position upon impact with an object to be diverted to thereby absorb at least some of the impact between the arm and the object being diverted; and
   wherein said arm comprises at least first and second arm portions, said first and second arm portions releasably interlocked, when released said first and second arm portions permitting removal of the drive belt without disassembly of the paddle diverter assembly.

16. The paddle diverter assembly according to claim 15, wherein said first and second arm portions are slidably releasable.

17. The paddle diverter assembly according to claim 15, wherein said first and second arm portions include a slidable joint therebetween, said slidable joint being selectively fixable wherein said first and second arm portions are interlocked and being selectively releasable to permit removal of said belt.

18. The paddle diverter assembly according to claim 17, wherein said slidable joint comprises a dovetail joint.

19. The paddle diverter assembly according to claim 18, wherein said dovetail joint comprises an angled dovetail joint.

20. The paddle diverter assembly according to claim 18, wherein said arm portion comprises at least two extruded sections.

21. The paddle diverter assembly according to claim 15, wherein said first and second arm portions releasably interlock at a fixed length to form a rigid member having a longitudinal extent along a longitudinal axis and a transverse extent, further comprising first and second spaced apart pulleys mounted to said rigid member, said belt drive being supported by said pulleys about said rigid member, and said first and second arm portions releasably interlocked at a fixed length and being releasable wherein said first pulley and said second pulley can be moved closer together wherein said belt can be removed for repair or replacement.

22. A diverter system comprising:
a conveying surface having a conveying direction and for conveying an article at a conveying speed;
a pair of diverter assemblies at opposite sides of said conveying surface, each of said diverter assemblies comprising an arm mounted for pivotal movement between a non-diverting position and a diverting position wherein said arm is pivoted across at least a portion of said conveying surface; and
a drive system independently and selectively moving said arms between said diverting positions and said non-diverting positions wherein said arms may be individually moved to their respective diverting positions and wherein an article conveyed on said conveying surface is diverted in a diverting direction when the article contacts one of said arms when said one arm is in said diverting position, wherein said drive system permits said arms to pivot away from their diverting positions when impacted by an article to thereby reduce the impact on the article being diverted and return said arms to their diverting positions by an electromagnetic field.

23. The diverter assembly in claim 22, wherein said drive system comprises a driver for each arm, said drivers being independently actuated to move said arms to their respective diverting positions.

24. The diverter assembly in claim 23, wherein said drive system comprises a controller, said controller selectively and independently actuating said drivers.

25. The diverter assembly in claim 24, wherein said controller comprises a servo controller.

26. The diverter assembly according to claim 22, wherein each of said arms includes a driven diverting surface.

27. The diverter system according to claim 26, wherein at least one of said driven diverting surfaces comprises a drive belt.

28. The diverter system according to claim 27, wherein each arm comprises a horizontal extent, said drive at belt extending around said horizontal extent, said belt being driven about said horizontal extent and providing said driven diverting surface.

29. The diverter system according to claim 22, wherein each of said arms includes a horizontal extent and a belt extending around said horizontal extent, said belts being driven around the respective horizontal extents and providing driven diverting surfaces for each of said arms.

30. The diverter system according to claim 29, wherein each of said drive belts is driven by a driven roller, said driven rollers driven by said drive system.

31. The diverter system according to claim 30, wherein each of said driven rollers includes a driven axis about which said driven roller is driven, and said arms pivoting about a respective pivot axis when pivoting between said non-diverting position and said diverting position.

32. The diverter system according to claim 31, wherein said driven axis of a respective arm and said respective pivot axis of said respective arm are generally collinear.

33. The diverter system according to claim 32, wherein said drive system is adapted to de-couple movement of said drive belts about said driven axes from movement of said arms about said pivot axes.

34. The diverter system according to claim 33, wherein said drive system includes a motor for pivoting each of said arms and a motor for driving each of said drive belts, said motors independently actuated by said drive system.

35. A method or selectively diverting an object, said method comprising:
providing at least one paddle assembly having an arm;
moving the arm with a drive assembly to a diverting position; and
absorbing at least some of the impact between the object and the arm with the drive assembly allowing the arm to move away from the diverting position when the arm makes contact with an object to thereby absorb some of the impact; and
returning the arm to the diverting position with an electromagnetic field.

36. The method according to claim 35, wherein said moving comprises pivoting the arm to the diverting position.

37. The method according to claim 36, wherein said pivoting includes pivoting the arm with a servo controlled motor.

38. The method according to claim 35, further comprising providing a pair of paddle assemblies and selectively moving each of the paddle assemblies to a diverting position.

39. The method according to claim 38, wherein said selectively includes individually moving the paddle assemblies.

40. The paddle diverter assembly according to claim 13, wherein said control system further includes a pair of sensors, said sensors for detecting the leading edge and the tailing edge of an article on said conveying surface, and said control system determining the length of an article being diverted.

* * * * *

UNITED STATES PATENT AND TRADEMARK OFFICE
CERTIFICATE OF CORRECTION

PATENT NO. : 7,124,876 B2
APPLICATION NO. : 10/796917
DATED : October 24, 2006
INVENTOR(S) : Stephen C. Wolf Page 1 of 1

It is certified that error appears in the above-identified patent and that said Letters Patent is hereby corrected as shown below:

Column 16:
Line 29, Claim 14, "lougitudinal" should be --longitudinal--.
Line 31, Claim 14, "lougitudinal" should be --longitudinal--.

Column 17:
*Line 40, Claim 23, "assembly" should be --system--.
*Line 44, Claim 24, "assembly" should be --system--.
*Line 47, Claim 25, "assembly" should be --system--.
*Line 49, Claim 26, "assembly" should be --system--.
*Line 55, Claim 28, delete "at" after "drive".

Column 18:
Line 25, Claim 35, "or" should be --of--.

Signed and Sealed this

First Day of May, 2007

JON W. DUDAS
*Director of the United States Patent and Trademark Office*